(12) United States Patent
Yoshida et al.

(10) Patent No.: US 6,409,288 B2
(45) Date of Patent: Jun. 25, 2002

(54) BRAKING FORCE CONTROLLING APPARATUS

(75) Inventors: Hiroaki Yoshida, Mishima; Satoshi Shimizu, Susono, both of (JP)

(73) Assignee: Toyota Jidosha Kabushiki Kaisha, Tokyo (JP)

(*) Notice: Subject to any disclaimer, the term of this patent is extended or adjusted under 35 U.S.C. 154(b) by 0 days.

(21) Appl. No.: 09/171,589

(22) PCT Filed: Apr. 24, 1997

(86) PCT No.: PCT/JP97/01435
§ 371 (c)(1),
(2), (4) Date: Oct. 21, 1998

(87) PCT Pub. No.: WO97/41018
PCT Pub. Date: Nov. 6, 1997

(30) Foreign Application Priority Data

Apr. 26, 1996 (JP) .............................................. 8-108180

(51) Int. Cl.⁷ .............................................. B60T 13/66
(52) U.S. Cl. ..................................... 303/155; 303/113.4
(58) Field of Search .......................... 303/115.3, 113.4, 303/155, 166, DIG. 1–DIG. 4, 10, 11; 188/DIG. 1

(56) References Cited

U.S. PATENT DOCUMENTS

| | | | |
|---|---|---|---|
| 4,494,199 A | * | 1/1985 | Lehmann ..................... 303/155 |
| 5,158,343 A | * | 10/1992 | Reichelt et al. .......... 303/113.4 |
| 5,220,307 A | * | 6/1993 | May et al. ................... 340/439 |
| 5,261,730 A | | 11/1993 | Steiner et al. |
| 5,350,225 A | | 9/1994 | Steiner et al. |
| 5,367,942 A | | 11/1994 | Nell et al. |
| 5,427,442 A | | 6/1995 | Heibel |
| 5,445,444 A | | 8/1995 | Rump et al. |
| 5,492,397 A | | 2/1996 | Steiner et al. |
| 5,496,099 A | | 3/1996 | Resch |
| 5,499,866 A | | 3/1996 | Brugger et al. |
| 5,511,862 A | * | 4/1996 | Fuuioka ....................... 303/171 |
| 5,513,906 A | | 5/1996 | Steiner |

(List continued on next page.)

FOREIGN PATENT DOCUMENTS

| | | |
|---|---|---|
| EP | WO96/6753 | 3/1996 |
| EP | 0711695 | 5/1996 |
| EP | 97 91 9681 | 6/2000 |
| GB | 2282649 | 4/1995 |
| GB | 2295209 | 5/1996 |
| JP | 61-268560 | 11/1986 |
| JP | 3-227766 | 10/1991 |
| JP | 4-121260 | 4/1992 |
| JP | 4-121604 | 4/1992 |
| JP | 5-97022 | 4/1993 |
| JP | 07-076267 | 3/1995 |
| JP | 07-165038 | 6/1995 |
| JP | 7-329766 | 12/1995 |
| JP | 8-34326 | 2/1996 |
| JP | 8-40229 | 2/1996 |
| JP | 8-295224 | 11/1996 |
| WO | WO6/06753 | 3/1996 |
| WO | WO96/06763 | 3/1996 |

Primary Examiner—Matthew C. Graham
(74) Attorney, Agent, or Firm—Kenyon & Kenyon

(57) ABSTRACT

A braking force controlling apparatus changes a magnitude of a braking force produced by a braking operation based on a speed of the braking operation. The braking force controlling apparatus is directed to maintaining a brake-assisting control even when a beginner unintentionally releases a braking operation force on a brake pedal. A hydraulic pressure sensor (40) detects a master cylinder pressure, and a maximum master cylinder pressure during the braking operation of the brake pedal (30) is stored in an ECU (10). When the master cylinder pressure is found to be below a release-judgment level of the master cylinder pressure, which is determined based on the maximum master cylinder pressure, the brake-assisting control is terminated. When the master cylinder pressure is found to be above the release-judgment level, the brake-assisting control is maintained.

10 Claims, 6 Drawing Sheets

U.S. PATENT DOCUMENTS

| | | |
|---|---|---|
| 5,535,123 A | 7/1996 | Rump et al. |
| 5,549,369 A | 8/1996 | Rump et al. |
| 5,556,173 A | 9/1996 | Steiner et al. |
| 5,558,409 A * | 9/1996 | Walenty et al. .............. 303/155 |
| 5,564,797 A | 10/1996 | Steiner et al. |
| 5,567,021 A | 10/1996 | Gaillard |
| 5,584,542 A * | 12/1996 | Kiarer et al. ........... 188/DIG. 1 |
| 5,586,814 A | 12/1996 | Steiner |
| 5,658,055 A | 8/1997 | Dieringer et al. |
| 5,660,448 A | 8/1997 | Kiesewetter et al. |
| 5,669,676 A | 9/1997 | Rump et al. |
| 5,719,769 A | 2/1998 | Brugger et al. |
| 5,720,532 A | 2/1998 | Steiner et al. |
| 5,727,854 A * | 3/1998 | Pueschel et al. ............ 303/155 |
| 5,772,290 A | 6/1998 | Heibel et al. |
| 5,779,329 A * | 7/1998 | Takeshima ................... 303/155 |
| 5,845,976 A * | 12/1998 | Muenster ..................... 303/155 |
| 5,851,057 A * | 12/1998 | Ferazawa et al. ........... 303/155 |
| 5,954,407 A * | 9/1999 | Schramm et al. ........... 303/155 |

\* cited by examiner

BRAKING FORCE CONTROLLING APPARATUS

FIELD OF THE INVENTION

The present invention generally relates to a braking force controlling apparatus, and more particularly to a braking force controlling apparatus which changes a magnitude of a braking force produced in response to a braking operation based on a speed of the braking operation.

DESCRIPTION OF THE RELATED ART

As disclosed in Japanese Laid-Open Patent Application No. 4-121260, there is known a braking force controlling apparatus which generates an increased braking force larger than a braking force during a normal control, when it is detected that an emergency braking operation is performed on an automotive vehicle. The conventional apparatus of the above publication is provided with a brake booster which generates a boosted pressure in response to a braking operation force Fp on a brake pedal of the vehicle, or the boosted pressure being equal to the braking operation force Fp multiplied by a given magnification factor. The boosted pressure is delivered from the brake booster to a master cylinder. The master cylinder generates a master cylinder pressure Pmc in response to the boosted pressure delivered from the brake booster, and the master cylinder pressure Pmc is proportional to the braking operation force Fp.

Further, the conventional apparatus of the above publication is provided with a high-pressure source having a pump which generates a brake-assisting pressure. The high-pressure source generates a brake-assisting pressure in accordance with a drive signal supplied by a control circuit. When a speed of the braking operation of the brake pedal exceeds a reference speed, it is determined that an emergency braking operation is performed by a vehicle operator, and the control circuit supplies a drive signal to the high-pressure source, the drive signal requesting a maximum brake-assisting pressure to be generated by the high-pressure source. Both the brake-assisting pressure generated by the high-pressure source and the master cylinder pressure Pmc generated by the master cylinder are supplied to a switching valve, and the switching valve delivers a larger one of the brake-assisting pressure and the master cylinder Pmc to wheel cylinders of the vehicle.

In the conventional apparatus of the above publication, when the speed of the braking operation is below the reference speed, the master cylinder pressure Pmc, which is proportional to the braking operation force Fp, is supplied to the wheel cylinders. Hereinafter, the control that is performed to generate the braking force by the braking operation under such a condition will be called a normal control. On the other hand, when the speed of the braking operation is above the reference speed, the brake-assisting pressure, which is generated by the high-pressure source, is supplied to the wheel cylinders. Hereinafter, the control that is performed to generate an increased braking force larger than the braking force generated during the normal control, under such a condition, will be called a brake-assisting control.

In the conventional apparatus of the above publication, when the braking operation of the brake pedal is performed at a normal speed, the braking force is controlled to the magnitude that is proportional to the braking operation force Fp, and, when the emergency braking operation of the brake pedal is performed, the braking force is quickly increased to be larger than the braking force during the normal control.

When a condition that requires the emergency braking operation is avoided, it is necessary to terminate the brake-assisting control and restart the normal control. The vehicle operator releases the braking operation force on the brake pedal after the condition requiring the emergency braking is avoided. If such a decrease of the braking operation force on the brake pedal is detected, it is possible to determine the time of termination of the brake-assisting control based on the detected braking operation force decrease.

However, according to experiments performed by the inventors of the present invention, it is concluded that beginners who are less experienced in vehicle operation tend to unintentionally release the brake pedal during the emergency braking operation. In the conventional apparatus of the above publication, when the decrease of the braking operation force on the brake pedal is detected, the brake-assisting control is automatically terminated even if a beginner unintentionally releases the brake pedal.

Therefore, when the beginner unintentionally releases the braking operation force on the brake pedal during the emergency braking operation, the conventional apparatus of the above publication automatically terminates the brake-assisting control and restarts the normal control based on the detected braking operation force change. However, the condition requiring the emergency braking still exists when the brake-assisting control is terminated. In such a case, the termination of the braking-assisting control is too early to ensure a vehicle running stability. Hence, the capability of the conventional apparatus of the above publication is inadequate to effectively achieve the function of the brake-assisting control.

SUMMARY OF THE INVENTION

An object of the present invention is to provide an improved braking force controlling apparatus in which the above-described problems are eliminated.

Another, more specific object of the present invention is to provide a braking force controlling apparatus which safely maintains the brake-assisting control even if a beginner unintentionally releases the braking operation force on the brake pedal during the emergency braking operation.

The above-mentioned objects of the present invention are achieved by a braking force controlling apparatus which selectively performs one of a normal control to generate a braking force by a braking operation and a brake-assisting control to generate an increased braking force larger than the braking force generated during the normal control, the apparatus comprising: an operation quantity detection means which detects a quantity of a braking operation of a brake pedal; a maximum operation quantity storage means which stores a maximum quantity of the braking operation during the braking operation of the brake pedal; and a brake-assisting control termination judgment means which determines whether the brake-assisting control should be terminated based on the braking operation quantity detected by the operation quantity detection means and the maximum quantity stored by the maximum operation quantity storage means.

In the braking force controlling apparatus of the present invention, the time of termination of the brake-assisting control is determined based on the braking operation quantity detected by the operation quantity detection means and the maximum quantity stored by the maximum operation quantity storage means.

When the emergency braking is required, an experienced vehicle operator intentionally maintains the braking operation force on the brake pedal. After the condition requiring the emergency braking is avoided, the vehicle operator intentionally releases the braking operation force on the brake pedal. However, the beginner tends to unintentionally release the brake pedal during the emergency braking operation, which causes a decrease of the braking operation force on the brake pedal.

Generally, a decrease of the quantity of the braking operation of the brake pedal by an unintentional operation of the beginner is smaller than a decrease of the quantity of the braking operation by an intentional operation of the experienced vehicle operator. It is possible to determine whether the braking operation of the brake pedal is performed intentionally or not, by correctly detecting the decrease of the quantity of the braking operation.

Accordingly, it is possible for the braking force controlling apparatus of the present invention to maintain the brake-assisting control when the decrease of the quantity of the braking operation is determined as being not caused by the intentional operation, and to terminate the brake-assisting control when the decrease of the quantity of the braking operation is determined as being caused by the intentional operation.

In addition, the quantity of the braking operation of the brake pedal during the emergency braking operation may differ according to the individual vehicle operators. In the braking force controlling apparatus of the present invention, a maximum quantity of the braking operation during the braking operation is stored by the maximum operation quantity storage means. The determination as to whether the brake-assisting control should be terminated is made based on the maximum quantity stored by the maximum operation quantity storage means and the braking operation quantity detected by the operation quantity detection means. It is possible to determine the time of the termination of the brake-assisting control with accuracy by eliminating the differences of the braking operation quantity according to the individual vehicle operators.

In a preferred embodiment of the present invention, the braking force controlling apparatus may be constructed such that the brake-assisting control termination judgment means terminates the brake-assisting control when the braking operation quantity is smaller than a difference between the maximum quantity and a predetermined decrease quantity. Further, in another preferred embodiment of the present invention, the braking force controlling apparatus may be constructed such that the brake-assisting control termination judgment means terminates the brake-assisting control when the braking operation quantity is smaller than a product of the maximum quantity and a decrease ratio.

In these embodiments of the present invention, it is possible to determine the time of the termination of the brake-assisting control with an increased accuracy by setting the decrease quantity or the decrease ratio at an appropriate value.

In a preferred embodiment of the present invention, the braking force controlling apparatus may be constructed such that the brake-assisting control termination judgment means determines whether a brake releasing operation during the brake-assisting control is an intentional operation based on the braking operation quantity detected by the operation quantity detection means and the maximum quantity stored by the maximum operation quantity storage means, wherein, when the brake releasing operation is determined as being not an intentional operation, the brake-assisting control termination judgment means maintains the brake-assisting control.

The above-mentioned objects of the present invention are achieved by a braking force controlling apparatus which selectively performs one of a normal control to generate a braking force by a braking operation and a brake-assisting control to generate an increased braking force larger than the braking force generated during the normal control, the apparatus comprising: an operation quantity detection means which detects a quantity of a braking operation of a brake pedal; a maximum operation quantity storage means which stores a maximum quantity of the braking operation during the braking operation of the brake pedal; and a brake-assisting control continuation judgment means which determines whether a brake releasing operation during the brake-assisting control is an intentional operation based on the braking operation quantity detected by the operation quantity detection means and the maximum quantity stored by the maximum operation quantity storage means, wherein, when the brake releasing operation is determined as being not an intentional operation, the brake-assisting control continuation judgment means maintains the brake-assisting control.

In the braking force controlling apparatus of the present invention, the brake-assisting control continuation judgment means determines whether a brake releasing operation during the brake-assisting control is an intentional operation. When the brake releasing operation is determined as being not an intentional operation, the brake-assisting control continuation judgment means maintains the brake-assisting control. Hence, when the emergency braking is required, it is possible for the braking force controlling apparatus of the present invention to quickly increase the braking force to be larger than the level during the normal control by maintaining the brake-assisting control.

In the braking force controlling apparatus of the present invention, the brake-assisting control continuation judgment means makes the determination as to whether the brake releasing operation during the brake-assisting control is an intentional operation, based on the braking operation quantity detected by the operation quantity detection means and the maximum quantity stored by the maximum operation quantity storage means. When the brake releasing operation is determined as being an intentional operation, the brake-assisting control continuation judgment means terminates the brake-assisting control. However, when the brake releasing operation is determined as being not an intentional operation, the brake-assisting control continuation judgment means maintains the brake-assisting control. Hence, the braking force controlling apparatus of the present invention is effective in maintaining the brake-assisting control even if a beginner unintentionally releases the braking operation force on the brake pedal during the emergency braking operation.

BRIEF DESCRIPTION OF THE DRAWINGS

Other objects, features and advantages of the present invention will be more apparent from the following detailed description when read in conjunction with the accompanying drawings in which.

DESCRIPTION OF THE PREFERRED EMBODIMENTS

A description will now be given of the preferred embodiments of the present invention with reference to the accompanying drawings.

Figure 1:
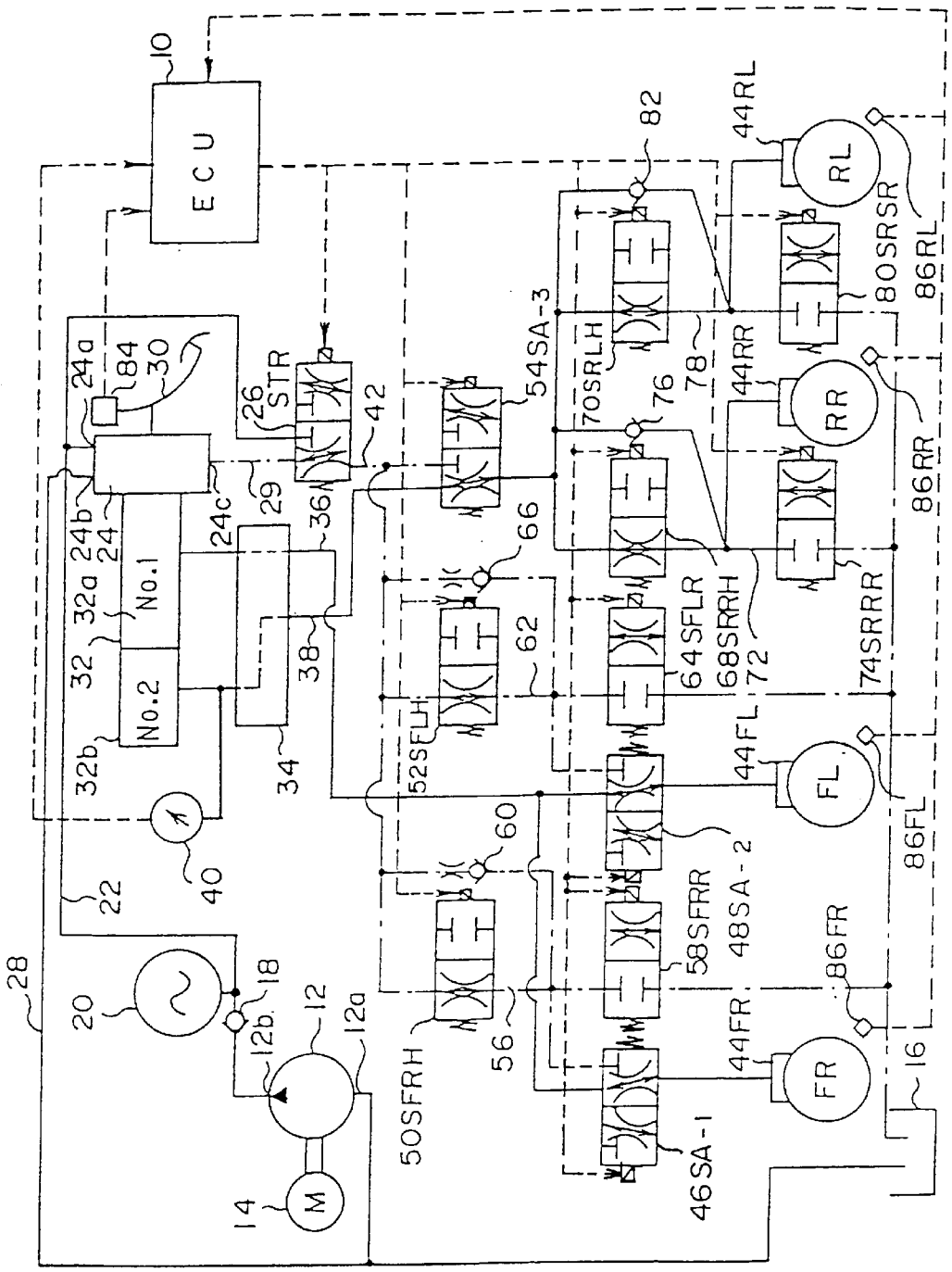
FIG. 1 is a diagram of a first embodiment of a braking force controlling apparatus of the present invention.

FIG. 1 shows a first embodiment of the braking force controlling apparatus of the present invention. The braking force controlling apparatus of FIG. 1 is incorporated in an automotive vehicle, and controlled by an electronic control unit 10 (hereinafter, called ECU 10).

In FIG. 1, input signal paths on which signals supplied by certain elements of the braking force controlling apparatus are sent to the ECU 10, and output signal paths on which signals supplied by the ECU 10 are sent to certain elements of the braking force controlling apparatus are indicated by the dotted-line arrows in FIG. 1. Further, brake fluid paths on which brake fluid is supplied between the elements of the braking force controlling apparatus are indicated by the solid lines or the one-dot chain lines in FIG. 1.

The braking force controlling apparatus includes a pump 12. The pump 12 is provided with an actuating motor 14. The actuating motor 14 actuates the pump 12 so that the pump 12 supplies a high-pressure brake fluid. The pump 12 has an inlet port 12a which is connected to a reservoir tank 16. The pump 12 has an outlet port 12b which is connected to an accumulator 20 via a check valve 18. The pump 12 produces a high-pressure brake fluid from the brake fluid received from the reservoir tank 16, and supplies the high-pressure brake fluid from the outlet port 12b to the accumulator 20 so that the accumulator 20 stores the high-pressure brake fluid supplied by the pump 12. The check valve 18 allows only a flow of the high-pressure brake fluid from the pump 12 to the accumulator 20, and inhibits a counter flow of the brake fluid from the accumulator 20 to the pump 12.

The accumulator 20 is connected through a high-pressure line 22 to a high-pressure port 24a of a regulator 24. The accumulator 20 is further connected through the high-pressure line 22 to a regulator switching solenoid 26 (hereinafter, called STR 26). The regulator 24 has a low-pressure port 24b which is connected through a low-pressure line 28 to the reservoir tank 16. The regulator 24 has a controlled-pressure port 24c which is connected through a controlled-pressure line 29 to the STR 26. The STR 26 is a two-position solenoid valve which selectively opens one of the high-pressure line 22 and the controlled-pressure line 29 and closes the other. The STR 26 is normally set in a first position so that the STR 26 opens the controlled-pressure line 29 and closes the high-pressure line 22. When a drive signal is supplied to the STR 26 by the ECU 10, the STR 26 is set in a second position so that the STR 26 closes the controlled-pressure line 29 and opens the high-pressure line 22. A brake pedal 30 is connected to the regulator 24, and a master cylinder 32 is fixed to the regulator 24. The regulator 24 contains a pressure chamber therein, and the controlled-pressure port 24c is open to the pressure chamber of the regulator 24. In the regulator 24, one of the high-pressure port 24a and the low-pressure port 24b is selectively connected to the pressure chamber in response to a condition (a speed or a quantity) of the braking operation of the brake pedal 30.

The regulator 24 is arranged such that the internal pressure of the pressure chamber is adjusted to a brake fluid pressure proportional to the braking operation force Fp on the brake pedal 30. Hence, the brake fluid pressure proportional to the braking operation force Fp is present at the controlled-pressure port 24c of the regulator 24. Hereinafter, this brake fluid pressure will be called the regulator pressure Pre.

The braking operation force Fp exerted on the brake pedal 30 is mechanically transmitted to the master cylinder 32 via the regulator 24. In addition, a force proportional to the regulator pressure Pre at the controlled-pressure port 24c of the regulator 24 is transmitted to the master cylinder 32. Hereinafter, this force will be called the brake-assisting force Fa. Hence, when the brake pedal 30 is depressed, a resultant force of the braking operation force Fp and the brake-assisting force Fa is transmitted to the master cylinder 32.

The master cylinder 32 includes a first pressure chamber 32a ("No. 1") and a second pressure chamber 32b ("No. 2") provided therein. In the master cylinder 32, a master cylinder pressure Pmc, which is proportional to the resultant force of the braking operation force Fp and the brake-assisting force Fa, is produced in both the first pressure chamber 32a and the second pressure chamber 32b. A proportioning valve 38 (hereinafter, called the P valve 38) is connected to both the first pressure chamber 32a and the second pressure chamber 32b of the master cylinder 32. Hence, both the master cylinder pressure Pmc produced in the first pressure chamber 32a and the master cylinder pressure Pmc produced in the second pressure chamber 32b are supplied to the P valve 34.

A first pressure line 36 and a second pressure line 38 are connected to the P valve 34. When the master cylinder pressure Pmc is below a reference pressure, the P valve 34 supplies the master cylinder pressure Pmc to both the first pressure line 36 and the second pressure line 38. When the master cylinder pressure Pmc is above the reference valve, the P valve 34 supplies the master cylinder pressure Pmc to the first pressure line 36 and supplies a reduced pressure to the second pressure line 38. The reduced pressure, supplied to the second pressure line 38 in this case, is equal to the master cylinder pressure Pmc multiplied by a given reduction ratio.

A hydraulic pressure sensor 40 is connected to the brake fluid path between the P valve 34 and the second pressure chamber 32b of the master cylinder 32. The hydraulic pressure sensor 40 outputs a signal, indicative of the master cylinder pressure Pmc, to the ECU 10. The ECU 10 detects the master cylinder pressure Pmc, produced in the master cylinder 32, based on the signal supplied by the hydraulic pressure sensor 40.

A third pressure line 42 is connected to the STR 26. As described above, the STR 26 selectively opens one of the high-pressure line 22 and the controlled-pressure line 29 and closes the other. The brake fluid pressure from one of the high-pressure line 22 and the controlled-pressure line 29 is supplied to the third pressure line 42 according to the position of the STR 26. In the present embodiment, the brake fluid pressure from one of the first pressure line 36 connected to the P valve 34 and the third pressure line 42 connected to the STR 26, is supplied to both a wheel cylinder 44FR and a wheel cylinder 44FL, which are respectively provided on a front-right wheel ("FR") and a front-left wheel ("FL") of the vehicle. Further, in the present embodiment, the brake fluid pressure from one of the second pressure line 38 connected to the P valve 34 and the third pressure line 42 connected to the STR 26, is supplied to both a wheel cylinder 44RR and a wheel cylinder 44RL, which are respectively provided on a rear-right wheel ("RR") and a rear-left wheel ("RL") of the vehicle.

A first pressure-assisting solenoid 46 (hereinafter, called SA-1 46) and a second pressure-assisting solenoid 48 (hereinafter, called SA-2 48) are connected to the first pressure line 36. A front-right pressure-holding solenoid 50 (hereinafter, called SFRH 50), a front-left pressure-holding solenoid 52 (hereinafter, called SFLH 52), and a third pressure-assisting solenoid 54 (hereinafter, called SA-3 54) are connected to the third pressure line 42.

The SFRH 50 is a two-position solenoid valve which is normally set in a valve-open position. The SFRH 50 is connected through a pressure adjustment line 56 to both the SA-1 46 and a front-right pressure-reducing solenoid 58 (hereinafter, called SFRR 58). A check valve 60 is provided in a bypass line between the third pressure line 42 and the pressure adjustment line 56. The check valve 60 allows only a flow of the brake fluid from the pressure adjustment line 56 to the third pressure line 42, and inhibits a counter flow of the brake fluid from the third pressure line 42 to the pressure adjustment line 56.

The SA-1 46 is a two-position solenoid valve which selectively connects one of the first pressure line 36 and the pressure adjustment line 56 to the wheel cylinder 44FR. The SA-1 46 is normally set in a first position so that the SA-1 46 connects the first pressure line 36 to the wheel cylinder 44FR. When a drive signal is supplied to the SA-1 46 by the ECU 10, the SA-1 46 is set in a second position so that the SA-1 46 connects the pressure adjustment line 56 to the wheel cylinder 44FR. The SFRR 58 is a two-position solenoid valve which disconnects the pressure adjustment line 56 from or connects the pressure adjustment line 56 to the reservoir tank 16. The SFRR 58 is normally set in a valve-closed position so that the SFRR 58 disconnects the pressure adjustment line 56 from the reservoir tank 16. When a drive signal is supplied to the SFRR 58 by the ECU 10, the SFRR 58 is set in a valve-open position so that the SFRR 58 connects the pressure adjustment line 56 to the reservoir tank 16.

The SFLH 52 is a two-position solenoid valve which is normally set in a valve-open position. The SFLH 52 is connected through a pressure adjustment line 62 to both the SA-2 48 and a front-left pressure-reducing solenoid 64 (hereinafter, called SFLR 64). A check valve 66 is provided in a bypass line between the third pressure line 42 and the pressure adjustment line 62. The check valve 66 allows only a flow of the brake fluid from the pressure adjustment line 62 to the third pressure line 42, and inhibits a counter flow of the brake fluid from the third pressure line 42 to the pressure adjustment line 62.

The SA-2 48 is a two-position solenoid valve which selectively connects one of the first pressure line 36 and the pressure adjustment line 62 to the wheel cylinder 44FL. The SA-2 48 is normally set in a first position so that the SA-2 48 connects the first pressure line 36 to the wheel cylinder 44FL. When a drive signal is supplied to the SA-2 48 by the ECU 10, the SA-2 48 is set in a second position so that the SA-2 48 connects the pressure adjustment line 62 to the wheel cylinder 44FL. The SFLR 64 is a two-position solenoid valve which disconnects the pressure adjustment line 62 from or connects the pressure adjustment line 62 to the reservoir tank 16. The SFLR 64 is normally set in a valve-closed position so that the SFLR 64 disconnects the pressure adjustment line 62 from the reservoir tank 16. When a drive signal is supplied to the SFLR 64 by the ECU 10, the SFLR 64 is set in a valve-open position so that the SFLR 64 connects the pressure adjustment line 62 to the reservoir tank 16.

The second pressure line 38 at the output of the P valve 34 is connected to the SA-3 54. A rear-right pressure-holding solenoid 68 (hereinafter, called SRRH 68) and a rear-left pressure-holding solenoid 70 (hereinafter, called SRLH 70) are connected to the downstream side of the SA-3 54. The SRRH 68 and the SRLH 70 are respectively provided for the wheel cylinder 44RR and the wheel cylinder 44RL.

The SA-3 54 is a two-position solenoid valve which selectively connects one of the second pressure line 38 and the third pressure line 42 to the SRRH 68 and the SRLH 70. The SA-3 54 is normally set in a first position so that the SA-3 54 connects the second pressure line 38 to the SRRH 68 and the SRLH 70. When a drive signal is supplied to the SA-3 54 by the ECU 10, the SA-3 54 is set in a second position so that the SA-3 54 connects the third pressure line 42 to the SRRH 68 and the SRLH 70.

The SRRH 68 is a two-position solenoid valve which is normally set in a valve-open position. The downstream side of the SRRH 68 is connected through a pressure adjustment line 72 to both the wheel cylinder 44RR and a rear-right pressure-reducing solenoid 74 (hereinafter, called SRRR 74). The SRRR 74 is a two-position solenoid valve which disconnects the pressure adjustment line 72 from or connects the pressure adjustment line 72 to the reservoir tank 16. The SRRR 74 is normally set in a valve-closed position so that the SRRR 74 disconnects the pressure adjustment line 72 from the reservoir tank 16. When a drive signal is supplied to the SRRR 74 by the ECU 10, the SRRR 74 is set in a valve-open position so that the SRRR 74 connects the pressure adjustment line 72 to the reservoir tank 16. A check valve 76 is provided in a bypass line between the SA-3 54 and the pressure adjustment line 72. The check valve 76 allows only a flow of the brake fluid from the pressure adjustment line 72 to the SA-3 54, and inhibits a counter flow of the brake fluid from the SA-3 54 to the pressure adjustment line 72.

The SRLH 70 is a two-position solenoid valve which is normally set in a valve-open position. The downstream side of the SRLH 70 is connected through a pressure adjustment line 78 to both the wheel cylinder 44RL and a rear-left pressure-reducing solenoid 80 (hereinafter, called SRLR 80). The SRLR 80 is a two-position solenoid valve which disconnects the pressure adjustment line 78 from or connects the pressure adjustment line 78 to the reservoir tank 16. The SRLR 80 is normally set in a valve-closed position so that the SRLR 80 disconnects the pressure adjustment line 78 from the reservoir tank 16. When a drive signal is supplied to the SRLR 80 by the ECU 10, the SRLR 80 is set in a valve-open position so that the SRLR 80 connects the pressure adjustment line 78 to the reservoir tank 16. A check valve 82 is provided in a bypass line between the SA-3 54 and the pressure adjustment line 78. The check valve 82 allows only a flow of the brake fluid from the pressure adjustment line 78 to the SA-3 54, and inhibits a counter flow of the brake fluid from the SA-3 54 to the pressure adjustment line 78.

In the braking force controlling apparatus of FIG. 1, a brake switch 84 is provided in the vicinity of the brake pedal 30. When the brake pedal 30 is depressed by the vehicle operator, the brake switch 84 outputs an ON signal to the ECU 10. The ECU 10 determines whether the braking operation is performed by the vehicle operator, based on the signal supplied by the brake switch 84.

In the braking force controlling apparatus of FIG. 1, a wheel speed sensor 86FR, a wheel speed sensor 86FL, a wheel speed sensor 86RR and a wheel speed sensor 86RL are provided in the vicinity of the front-right wheel FR, the front-left wheel FL, the rear-right wheel RR and the rear-left wheel RL of the vehicle, respectively. Hereinafter, these wheel speed sensors will be collectively referred to as the wheel speed sensors 86. Each of the wheel speed sensors 86 outputs a signal, indicative of the wheel speed of the related one of the wheels FR, FL, RR and RL, to the ECU 10. The ECU 10 detects the respective wheel speeds of the wheels FR, FL, RR and RL, based on the signals supplied by the wheel speed sensors 86.

In the braking force controlling apparatus of FIG. 1, the ECU 10 supplies the respective drive signals to the STR 26, the SA-1 46, the SA-2 48, the SA-3 54, the SFRH 50, the SFLH 52, the SFRR 58, the SFLR 64, the SRRH 68, the SRLH 70, the SRRR 74 and the SRLR 80 in a controlled manner based on the signals supplied by the hydraulic pressure sensor 40, the brake switch 84 and the wheel speed sensors 86.

Next, a description will be given of the operation of the braking force controlling apparatus of the present embodiment. When the operating condition of the vehicle is found stable, the normal control is performed by the braking force controlling apparatus of the present embodiment to generate a braking force in accordance with the braking operation force Fp on the brake pedal 30.

In order to perform the normal control by the braking force controlling apparatus, the ECU 10 supplies no drive signals to the STR 26, the SA-1 46, the SA-2 48, the SA-3 54, the SFRH 50, the SFLH 52, the SFRR 58, the SFLR 64, the SRRH 68, the SRLH 70, the SRRR 74 and the SRLR 80 so that the above solenoids are set in the positions as shown in FIG. 1.

More specifically, when the above solenoids of the braking force controlling apparatus are in the positions shown in FIG. 1, the wheel cylinders 44FR and 44FL are connected to the first pressure line 36, and the wheel cylinders 44RR and 44RL are connected to the second pressure line 38. In this condition, the master cylinder pressure Pmc from the master cylinder 32 is supplied to and received by the wheel cylinders 44FR, 44FL, 44RL and 44RR (hereinafter, these wheel cylinders will be collectively called the wheel cylinders 44). Hence, in each of the respective wheels FR, FL, RR and RL of the vehicle, the braking force in accordance with the braking operation force Fp is generated.

In the braking force controlling apparatus of the present embodiment, when it is found that any of the wheels of the vehicle will be locked, it is determined that anti-lock braking system (ABS) control execution conditions are satisfied. After this determination is made, the execution of the ABS control of the braking force controlling apparatus is started.

The ECU 10 calculates respective wheel speeds Vwfr, Vwfl, Vwrr and Vwrl (hereinafter, these wheel speeds will be collectively called the wheel speeds Vw) of the vehicle wheels based on the signals supplied by the wheel speed sensors 86. By using a known vehicle speed estimation method, the ECU 10 determines an estimated vehicle speed Vso from the calculated wheel speeds Vw. If the braking force is exerted on the vehicle by the braking operation, the ECU 10 calculates a slip ratio S of each of the vehicle wheels from the related wheel speed Vw and the estimated vehicle speed Vso in accordance with the following formula:

$$S=(Vso-Vw)\cdot 100/Vso \quad (1)$$

Then, the ECU 10 determines whether the ABS control execution conditions are satisfied based on the slip ratio S of each of the vehicle wheels. When the slip ratio S is found to be above a reference value, it is determined that the ABS control execution conditions are satisfied. When this determination is made, the ECU 10 supplies the drive signals to the SA-1 46, the SA-2 48 and the SA-3 54. When the drive signal is supplied to the SA1 46, the SA-1 46 is set in the second position so that the SA-1 46 connects the pressure adjustment line 56 to the wheel cylinder 44FR. The SA-1 46 closes off or disconnects the first pressure line 36 from the wheel cylinder 44FR. When the drive signal is supplied to the SA-2 48, the SA-2 48 is set in the second position so that the SA-2 48 connects the pressure adjustment line 62 to the wheel cylinder 44FL. The SA-2 48 closes off or disconnects the first pressure line 36 from the wheel cylinder 44FL. When the drive signal is supplied to the SA-3 54, the SA-3 54 is set in the second position so that the SA-3 54 connects the third pressure line 42 to the SRRH 68 and the SRLH 70. The SA-3 54 closes off or disconnects the second pressure line 38 from the SRRH 68 and the SRLH 70.

When the solenoids 46, 48 and 54 are set in the second positions as described above, the SFRH 50, the SFLH 52, the SRRH 68 and the SRLH 70 (these solenoids will be called the pressure-holding solenoids SH), as well as the SFRR 58, the SFLR 64, the SRRR 74 and the SRLR 80 (these solenoids will be called the pressure-reducing solenoids SR) are connected to the respective wheels cylinders 44, and the regulator pressure Pre from the regulator 24 is supplied to the upstream sides of the pressure-holding solenoids SH through the third pressure line 42 and the STR 26.

During the ABS control of the braking force controlling apparatus of the present embodiment wherein the solenoids 46, 48 and 54 are set in the second positions as described above, the pressure-holding solenoids SH and the pressure-reducing solenoids SR may be controlled by the ECU 10 such that the pressure-holding solenoids SH are set in the valve-open positions and the pressure-reducing solenoids SR are set in the valve-closed positions. When the ECU 10 performs this control procedure in the braking force controlling apparatus, a wheel cylinder pressure Pwc of the related one of the wheel cylinders 44 is increased up to the regulator pressure Pre. This control procedure will be called (1) a pressure-increasing control mode.

Alternatively, during the ABS control of the braking force controlling apparatus of the present embodiment wherein the solenoids 46, 48 and 54 are set in the second positions as described above, the pressure-holding solenoids SH and the pressure-reducing solenoids SR may be controlled by the ECU 10 such that the pressure-holding solenoids SH are set in the valve-closed positions and the pressure-reducing solenoids SR are set in the valve-closed positions. When the ECU 10 performs this control procedure in the braking force controlling apparatus, the wheel cylinder pressure Pwc of the related one of the wheel cylinders 44 is held at the same level without increase or decrease. Hereinafter, this control procedure will be called (2) a pressure-holding control mode.

Alternatively, during the ABS control of the braking force controlling apparatus of the present embodiment wherein the solenoids 46, 48 and 54 are set in the second positions as described above, the pressure-holding solenoids SH and the pressure-reducing solenoids SR may be controlled by the ECU 10 such that the pressure-holding solenoids SH are set in the valve-closed positions and the pressure-reducing solenoids SR are set in the valve-open positions. When the ECU 10 performs this control procedure in the braking force controlling apparatus, the wheel cylinder pressure Pwc of the related one of the wheel cylinders 44 is decreased. This control procedure will be called (3) a pressure-decreasing control mode.

In the braking force controlling apparatus of the present embodiment, the ECU 10 suitably performs one of (1) the pressure-increasing control mode, (2) the pressure-holding control mode and (3) the pressure-decreasing control mode so as to maintain the slip ratio S of each of the vehicle wheels FR, FL, RR and RL below the reference value, preventing all the vehicle wheels from being locked during the braking operation.

It is necessary to quickly decrease the wheel cylinder pressure Pwc of the related one of the wheel cylinders 44 after the vehicle operator releases the braking operation force on the brake pedal 30 during the ABS control. In the braking force controlling apparatus of the present embodiment, the check valves 60, 66, 76 and 82 are provided in the brake fluid paths connected to the wheel cylinders 44, so as to allow only the flow of the brake fluid from the pressure adjustment lines 56, 62, 72 and 78 (connected to the wheel cylinders 44) to the third pressure line 42. As the check valves 60, 66, 76 and 82 function in this manner, it is possible for the braking force controlling apparatus of the present embodiment to quickly decrease the wheel cylinder pressure Pwc after the vehicle operator releases the braking operation force on the brake pedal 30 during the ABS control.

During the ABS control of the braking force controlling apparatus of the present embodiment, the wheel cylinder pressure Pwc of the related one of the wheel cylinders 44 is suitably adjusted by supplying the regulator pressure Pre from the regulator 24 to the wheel cylinders 44. More specifically, when the brake fluid from the pump 12 is delivered to the wheel cylinders 44, the wheel cylinder pressure Pwc is increased, and, when the brake fluid within the wheel cylinders 44 is returned to the reservoir tank 16, the wheel cylinder pressure Pwc is decreased. If the increase of the wheel cylinder pressure Pwc is performed by using the master cylinder 32 as the only brake fluid pressure source, the brake fluid contained in the master cylinder 32 is gradually decreased through a repeated execution of the pressure-increasing control mode and the pressure-decreasing control mode. In such a condition, the master cylinder 32 may be malfunctioning due to a too small amount of the brake fluid contained in the master cylinder 32.

In order to avoid the malfunction of the master cylinder 32 mentioned above, in the braking force controlling apparatus of the present embodiment, the increase of the wheel cylinder pressure Pwc is performed by selectively using one of the master cylinder 32 and the pump 12 as the brake fluid pressure source. If the increase of the wheel cylinder pressure Pwc is performed by using the pump 12 as the brake fluid pressure source, the present embodiment can avoid the malfunction of the master cylinder 32. It is possible for the braking force controlling apparatus of the present embodiment to maintain a stable operating condition even when the ABS control is continuously performed over an extended period of time.

As described above, the execution of the ABS control of the braking force controlling apparatus of the present embodiment is started when it is found that any of the wheels of the vehicle will be locked. In other words, the prerequisite condition to start the execution of the ABS control of the braking force controlling apparatus of the present embodiment is that the vehicle operator exerts an adequate braking operation force Fp on the brake pedal 30 so as to produce a large slip ratio S of any of the vehicle wheels which can be detected by the braking force controlling apparatus.

Figure 2:
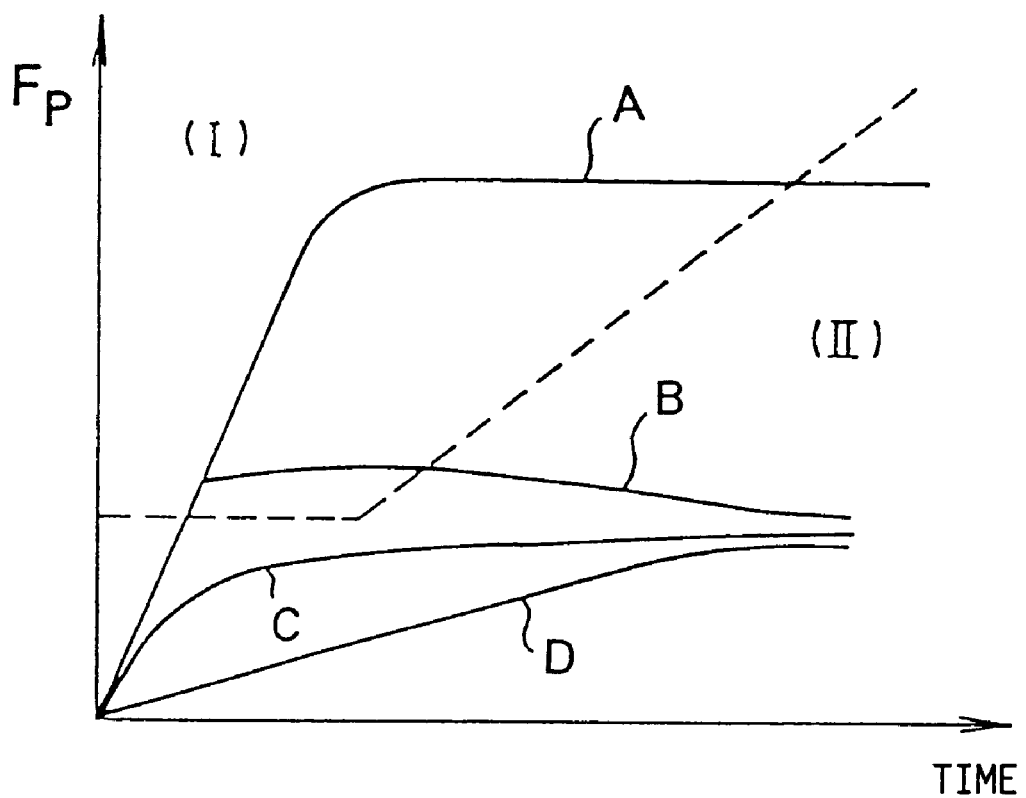
FIG. 2 is a diagram for explaining changes of a braking operation force on a brake pedal with respect to the elapsed time in various situations.

FIG. 2 shows changes of the braking operation force Fp on the brake pedal 30 with respect to the elapsed time in various situations. A change of the braking operation force Fp exerted on the brake pedal 30 by an experienced vehicle operator who is intended to perform an emergency braking operation, and a change of the braking operation force Fp exerted on the brake pedal 30 by a beginner who is intended to perform the emergency braking operation, are indicated by the curve "A" and the curve "B" in FIG. 2, respectively. Generally, it is necessary that the braking operation force Fp during the emergency braking operation is large enough to start the execution of the ABS control of the braking force controlling apparatus.

As indicated by the curve "A" of FIG. 2, in the case of the experienced vehicle operator, when a condition requiring the emergency braking has occurred, the braking operation force Fp on the brake pedal 30 is quickly raised to an adequately large level, and the braking operation force Fp is maintained at the adequately large level over a certain period of time. In response to the braking operation of the brake pedal 30, an adequately large master cylinder pressure Pmc from the master cylinder 32 is supplied to the wheel cylinders 44, and the ABS control of the braking force controlling apparatus can be started.

However, as indicated by the curve "B" of FIG. 2, in the case of the beginner, when the condition requiring the emergency braking has occurred, the braking operation force Fp may not be maintained at the adequately large level over a certain period of time although the braking operation force Fp is initially raised to the adequately large level. Hence, in response to the braking operation of the brake pedal 30 by the beginner, an adequately large master cylinder pressure Pmc from the master cylinder 32 may not be supplied to the wheel cylinders 44, and the ABS control of the braking force controlling apparatus cannot be started.

Generally, beginners who are less experienced in vehicle operation tend to unintentionally release the brake pedal 30 during the emergency braking operation. In the braking force controlling apparatus of the present invention, a braking force control procedure is performed by the ECU 10 when a brake releasing operation of the brake pedal 30 is determined as being an intentional operation, and this braking force control procedure allows the adequately large master cylinder pressure Pmc of the master cylinder 32 to be supplied to the wheel cylinders 44 even if the braking operation force Fp is not raised to the adequately large level as indicated by the curve "B" in FIG. 2. Hereinafter, this braking force control procedure will be called a brake-assisting control.

Before starting the brake-assisting control in the braking force controlling apparatus of the present invention, it is necessary to determine, with accuracy, whether a braking operation of the brake pedal 30 is intended to perform the emergency braking operation or not.

In FIG. 2, changes of the braking operation force Fp on the brake pedal 30 (which is intended to perform a normal braking operation) with respect to the elapsed time in various situations are indicated by the curves "C" and "D". As indicated by the curves "A" through "D", a rate of change of the braking operation force Fp during the normal braking operation is smaller than a rate of change of the braking operation force Fp during the emergency braking operation. In addition, a convergence value of the braking operation force Fp during the normal braking operation is smaller than that of the braking operation force Fp during the emergency braking operation.

The braking force controlling apparatus of the present invention takes account of the differences between the braking operation force Fp during the normal braking operation and the braking operation force Fp during the emergency braking operation as shown in FIG. 2. When a rate of change of the braking operation force Fp during an initial period of the braking operation is above a certain reference value and the braking operation force Fp is raised to an adequately large level (which falls within a region (I) above the borderline indicated by a dotted line in FIG. 2), the ECU 10 of the braking force controlling apparatus of the present invention determines that the braking operation of the brake pedal 30 is intended to perform the emergency braking operation.

On the other hand, when the rate of change of the braking operation force Fp during the initial period of the braking operation is not above the reference value, or when the braking operation force Fp is not raised to the adequately large level (which falls within a region (II) below the borderline indicated by the dotted line in FIG. 2), the ECU 10 of the braking force controlling apparatus of the present invention determines that the braking operation of the brake pedal 30 is intended to perform the normal braking operation.

In the braking force controlling apparatus of the present invention, the ECU 10 makes a determination as to whether a speed of the braking operation of the brake pedal 30 is above a reference speed, and makes a determination as to whether a quantity of the braking operation of the brake pedal 30 is above a reference quantity. In accordance with the results of the determinations, the ECU 10 can determine whether the braking operation of the brake pedal 30 is intended to perform the emergency braking operation or the normal braking operation.

In the braking force controlling apparatus of FIG. 1, the speed and the quantity of the braking operation of the brake pedal 30 are detected by using the master cylinder pressure Pmc as the parameter to define the braking operation speed or the braking operation quantity. The master cylinder pressure Pmc is detected by the ECU 10 based on the signal supplied by the hydraulic pressure sensor 40. The master cylinder pressure Pmc varies in proportion with the braking operation quantity, and a rate of change (dPmc) of the master cylinder pressure Pmc is in correspondence with the braking operation speed. Accordingly, before starting the brake-assisting control, the braking force controlling apparatus of the present embodiment can determine, with accuracy, whether the braking operation of the brake pedal 30 is intended to perform the emergency braking operation or not. Hereinafter, this function of the braking force controlling apparatus of the present embodiment will be called a brake-assisting control start judgment means. The ECU 10 acts as the brake-assisting control start judgment means.

Alternatively, in the braking force controlling apparatus of the present invention, the brake-assisting control start judgment means may be constituted by using another quantity of the braking operation of the brake pedal 30 other than the master cylinder pressure Pmc or the rate of change dPmc thereof described above with the present embodiment.

Next, a description will be given of the operation of the braking force controlling apparatus of the present embodiment after it is determined that the brake-assisting control should be started. As described above, in the present embodiment, when the speed of the braking operation of the brake pedal 30 (or the rate of change dPmc of the master cylinder pressure) is above the reference speed and the quantity of the braking operation of the brake pedal 30 (or the master cylinder pressure Pmc) is above the reference quantity, the ECU 10 determines that the braking operation of the brake pedal 30 is intended to perform the emergency braking operation.

When it is determined that the braking operation of the brake pedal 30 is intended to perform the emergency braking operation, the ECU 10 supplies the drive signals to the STR 26, the SA-1 46, the SA-2 48 and the SA-3 54.

When the drive signal is supplied to the STR 26 by the ECU 10, the STR 26 is set in the second position so that the STR 26 closes the controlled-pressure line 29 connected to the regulator 24, and connects the high-pressure line 22 to the third pressure line 42. The accumulator pressure Pacc from the accumulator 20 is supplied to the third pressure line 42 through the STR 26. When the drive signal is supplied to the SA-1 46, the SA-1 46 is set in the second position so that the SA-1 46 connects the pressure adjustment line 56 to the wheel cylinder 44FR. The SA-1 46 closes off or disconnects the first pressure line 36 from the wheel cylinder 44FR. When the drive signal is supplied to the SA-2 48, the SA-2 48 is set in the second position so that the SA-2 48 connects the pressure adjustment line 62 to the wheel cylinder 44FL. The SA-2 48 closes off or disconnects the first pressure line 36 from the wheel cylinder 44FL. When the drive signal is supplied to the SA-3 54, the SA-3 54 is set in the second position so that the SA-3 54 connects the third pressure line 42 to the SRRH 68 and the SRLH 70. The SA-3 54 closes off or disconnects the second pressure line 38 from the SRRH 68 and the SRLH 70.

Hence, when the drive signals are supplied to the STR 26, the SA-1 46, the SA-2 48 and the SA-3 54, all the wheel cylinders 44 are connected to both the pressure-holding solenoids SH and the pressure-reducing solenoids SR, and the accumulator pressure Pacc is supplied to the upstream sides of the pressure-holding solenoids SH through the STR 26.

Immediately when it is determined that the braking operation of the brake pedal 30 is intended to perform the emergency braking operation, the ECU 10 does not yet supply the drive signals to the pressure-holding solenoids SH or the pressure-reducing solenoids SR. The accumulator pressure Pacc is supplied to the wheel cylinders 44 through the pressure-holding solenoids SH. Consequently, the wheel cylinder pressure Pwc of each of the wheel cylinders 44 is quickly increased to the accumulator pressure Pacc.

Accordingly, it is possible for the braking force controlling apparatus of the present embodiment to quickly increase the wheel cylinder pressure Pwc of each of the wheel cylinders 44 when the emergency braking operation is performed, regardless of the magnitude of the braking operation force Fp. Therefore, in the braking force controlling apparatus of the present embodiment, after the condition requiring the emergency braking has occurred, it is possible to quickly generate an increased braking force larger than that generated during the normal control, even if the vehicle operator is a beginner.

After the accumulator pressure Pacc is continuously supplied to the wheel cylinders 44, the increased braking force is generated on the vehicle, and a relatively large slip ratio S of the vehicle wheels FR, FL, RR and RL is produced. It is then determined that the ABS control execution conditions are satisfied. After this determination is made, the execution of the ABS control of the braking force controlling apparatus of the present embodiment is started. As described above, the ECU 10 suitably performs one of (1) the pressure-increasing control mode, (2) the pressure-holding control mode and (3) the pressure-decreasing control mode so as to maintain the slip ratio S of each of the vehicle wheels FR, FL, RR and RL below the reference value, preventing all the vehicle wheels from being locked during the braking operation.

When the ABS control is performed following the emergency braking operation, the wheel cylinder pressure Pwc of each of the wheel cylinders 44 is increased by the supply of the accumulator pressure Pacc from the pump 12 or the accumulator 20 to the wheel cylinders 44, while the wheel cylinder pressure Pwc is reduced by the returning flow of the brake fluid within the wheel cylinders 44 to the reservoir tank 16. It is possible to prevent the malfunctioning of the master cylinder 32 even when the repeated execution of the pressure-increasing mode control and the pressure-reducing mode control is performed during the ABS control.

When the vehicle operator starts releasing the brake pedal 30 after the brake-assisting control was started by the emergency braking operation, it is necessary to terminate the brake-assisting control. In the braking force controlling apparatus of the present embodiment, during the execution of the brake-assisting control, the ECU 10 supplies the drive signals to the STR 26, the SA-1 46, the SA-2 48 and the SA-3 54. When the drive signals are supplied to the solenoids 26, 46, 48, and 54 by the ECU 10, the solenoids 26, 46, 48 and 54 are set in the second positions as described above. In this condition, the internal pressure chamber of the regulator 24 is isolated from the wheel cylinders 44 and the pump 12, and both the first pressure chamber 32a and the second pressure chamber 32b of the master cylinder 32 are isolated from the wheel cylinders 44 and the pump 12.

Hence, in the braking force controlling apparatus of the present embodiment, during the execution of the brake-assisting control, the master cylinder pressure Pmc varies in proportion with the braking operation force Fp on the brake pedal 30. By monitoring the master cylinder pressure Pmc which is detected based on the signal supplied by the hydraulic pressure sensor 40, the ECU 10 can easily determine whether a brake releasing operation of the brake pedal 30 is performed by the vehicle operator. When it is determined that the brake releasing operation is performed, the ECU 10 stops supplying the drive signals to the STR 26, the SA-1 46, the SA-2 48 and the SA-3 54. Hence, the brake-assisting control is terminated and the normal control is restarted.

Figure 3:
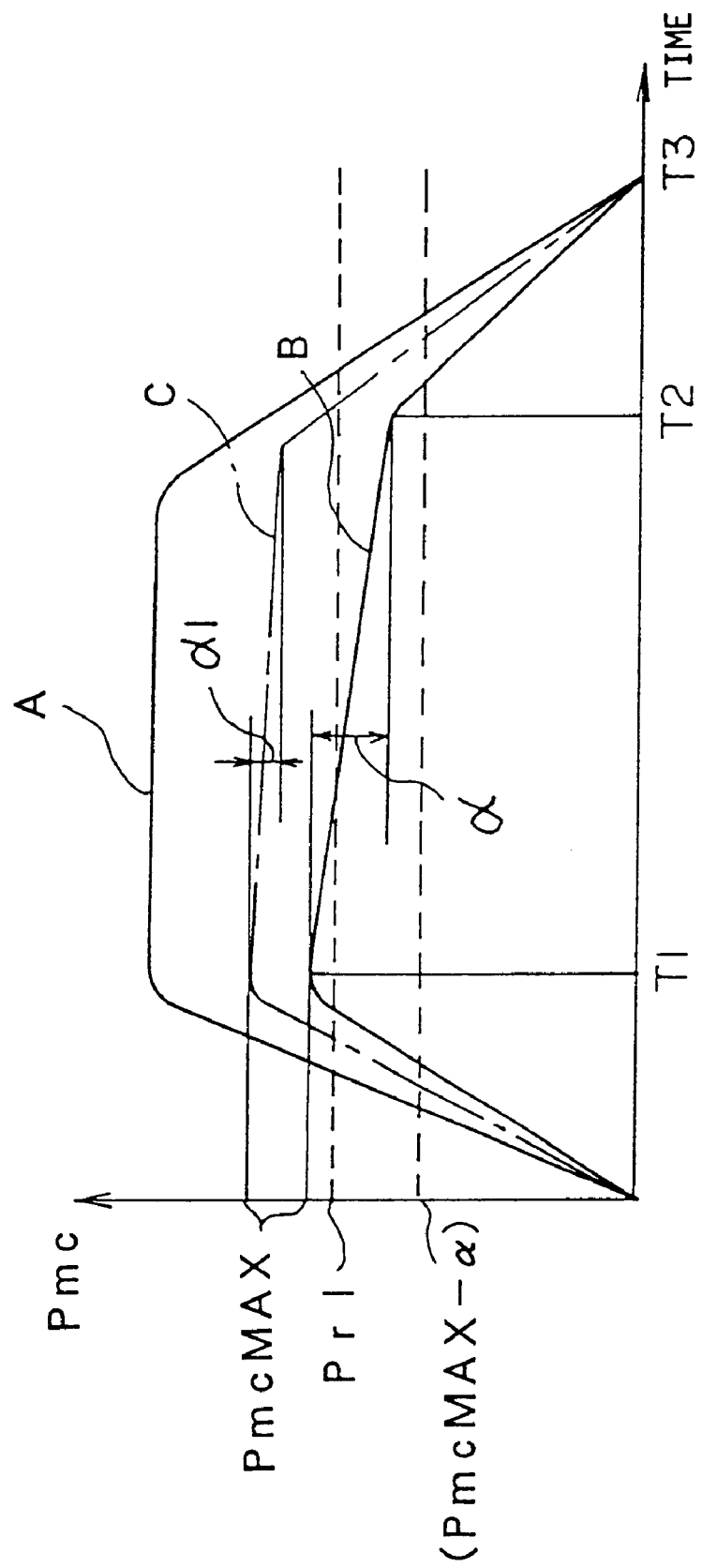
FIG. 3 is a diagram for explaining changes of a master cylinder pressure with respect to the elapsed time when an emergency braking operation is performed by various vehicle operators.

As described above, the beginners generally tend to unintentionally release the brake pedal 30 during the emergency braking operation. FIG. 3 shows changes of the master cylinder pressure Pmc with respect to the elapsed time when the emergency braking operation is performed by various vehicle operators. The master cylinder pressure Pmc is in correspondence with the braking operation force Fp exerted on the brake pedal 30. A change of the master cylinder pressure Pmc with respect to the elapsed time when the emergency braking operation is performed by an experienced vehicle operator is indicated by the curve "A" in FIG. 3. Changes of the master cylinder pressure Pmc with respect to the elapsed time when the emergency braking operation is performed by the beginners are indicated by the curves "B" and "C" in FIG. 3.

As indicated by the curve "A" of FIG. 3, in the case of the experienced vehicle operator, when a condition requiring the emergency braking has occurred, the master cylinder pressure Pmc is quickly raised to an adequately large level by the braking operation of the brake pedal 30. The master cylinder pressure Pmc is maintained at the adequately large level over a certain period of time.

However, as indicated by the curve "B" or "C" of FIG. 3, in the case of the beginner, when the condition requiring the emergency braking has occurred, the master cylinder pressure Pmc is not maintained at an adequately large level over a certain period of time after the master cylinder pressure Pmc is initially raised to a maximum master cylinder pressure PmcMAX. In FIG. 3, the adequately large level of the master cylinder pressure Pmc is indicated by "Prl" in FIG. 3. In addition, the beginner unintentionally releases the braking operation force Fp on the brake pedal 30 during the emergency braking operation. In the case of the beginner, there is a tendency that the master cylinder pressure Pmc is gradually decreased from the maximum master cylinder pressure PmcMAX. In the example indicated by the curve "B" of FIG. 3, during a period from the time "T1" to the time "T2", the beginner unintentionally releases the braking operation force Fp on the brake pedal 30 so that the master cylinder pressure Pmc is gradually decreased. The maximum master cylinder pressure PmcMAX is produced at the time "T1". The beginner intentionally releases the brake pedal 30 at the time "T2".

In the conventional apparatus of the afore-mentioned publication, when a decrease of the braking operation force on the brake pedal is detected, the brake-assisting control is automatically terminated even if the beginner unintentionally releases the brake pedal. Suppose that the level "Prl" is a fixed release-judgment level of the master cylinder pressure Pmc in the example of the curve "B" of FIG. 3. When the master cylinder pressure Pmc is decreased to be below the release-judgment level "Prl" shown in FIG. 3, the conventional apparatus automatically terminates the brake-assisting control and restarts the normal control based on the detected braking operation force change. However, the condition requiring the emergency braking still exists when the brake-assisting control is terminated. The capability of the conventional apparatus is inadequate to effectively achieve the function of the brake-assisting control.

The braking force controlling apparatus of the present embodiment is directed to eliminating the above problem of the conventional apparatus, and it is characterized in that a release-judgment level of a braking operation quantity (or the master cylinder pressure Pmc) is defined based on a maximum quantity of the braking operation (or the maximum master cylinder pressure PmcMAX) so as to safely maintain the brake-assisting control even if the beginner unintentionally releases the braking operation force on the brake pedal during the emergency braking operation.

In the example of the curve "B" of FIG. 3, the beginner effectively depresses the brake pedal 30 only in an initial period of the emergency braking operation so that the master cylinder pressure Pmc is initially raised to a maximum master cylinder pressure PmcMAX. However, the beginner unintentionally releases the brake pedal 30 during the emergency braking operation (or the period between the time "T1" and the time "T2" in FIG. 3), and the master cylinder pressure Pmc is not maintained at the adequately large level over a certain period of time after the master cylinder pressure Pmc is initially raised to the maximum master cylinder pressure PmcMAX. A decrease quantity of the master cylinder pressure Pmc during the period between the time "T1" and the time "T2", which is caused by the brake releasing operation of the brake pedal 30 by the beginner, is indicated by "α" in FIG. 3.

In the present embodiment, the decrease quantity "α" is predetermined in accordance with the experiments of the inventors. The release-judgment level of the master cylinder pressure Pmc is defined by a difference between the maximum master cylinder pressure PmcMAX and the decrease quantity α. That is, when the master cylinder pressure Pmc is smaller than the release-judgment level (PmcMAX−α), the braking force controlling apparatus of the present embodiment makes a determination that the brake-assisting control should be terminated.

The change of the master cylinder pressure Pmc with respect to the elapsed time during the emergency braking operation may differ according to the individual vehicle operators. For example, if it is assumed that the curve "C" in FIG. 3 indicates a change of the master cylinder pressure Pmc with respect to the elapsed time when the emergency braking operation is performed by a male beginner or a beginner who has a certain pedal-depressing force, then it can be assumed that the curve "B" in FIG. 3 indicates a change of the master cylinder pressure Pmc with respect to the elapsed time when the emergency braking operation is performed by a female beginner or a beginner who has little pedal-depressing force.

In the example of the curve "C" of FIG. 3, the male beginner effectively depresses the brake pedal 30 only during an initial period of the emergency braking operation so that the master cylinder pressure Pmc is initially raised to a maximum master cylinder pressure PmcMAX. This maximum master cylinder pressure PmcMAX is larger than that in the example of the curve "B" of FIG. 3. However, similar to the female beginner in the example of the curve "B", the male beginner in the example of the curve "C" unintentionally releases the brake pedal 30 during the period between the time "T1" and the time "T2" in FIG. 3. There is a tendency that the master cylinder pressure Pmc is gradually decreased during the period after the master cylinder pressure Pmc is initially raised to the maximum master cylinder pressure PmcMAX. A decrease quantity of the master cylinder pressure Pmc during the period between the time "T1" and the time "T2", which is caused by the brake releasing operation of the brake pedal 30 by the male beginner, is indicated by "α1" in FIG. 3. As shown in FIG. 3, the decrease quantity α1 in the example of the curve "C" (the case of the male beginner) is slightly smaller than the decrease quantity a in the example of the curve "B" (the case of the female beginner). In the present embodiment, the decrease quantity α is adjusted to a suitable value depending on the magnitude of the maximum master cylinder pressure PmcMAX.

Therefore, in the braking force controlling apparatus of the present embodiment, a maximum master cylinder pressure PmcMAX during the braking operation is stored in the ECU 10, and the determination as to whether the brake-assisting control should be terminated is made based on the maximum master cylinder pressure PmcMax stored in the ECU 10 and the master cylinder pressure Pmc detected by the ECU 10. It is possible to determine the time of the termination of the brake-assisting control with accuracy, so as to eliminate the differences of the braking operation quantity according to the individual vehicle operators.

In another preferred embodiment of the present invention, the braking force controlling apparatus may be constructed such that a maximum master cylinder pressure PmcMAX during the braking operation is stored in the ECU 10, and the determination as to whether the brake-assisting control should be terminated is made by comparing the master cylinder pressure Pmc (detected by the ECU 10) with a product of the maximum master cylinder pressure PmcMax (stored in the ECU 10) and a decrease ratio $\beta(0<\beta<1)$.

In the present embodiment, the release-judgment level of the master cylinder pressure Pmc is defined by the product PmcMAX×β. That is, when the master cylinder pressure Pmc is smaller than the release-judgment level PmcMAX×β, the braking force controlling apparatus of the present embodiment makes a determination that the brake-assisting control should be terminated.

In the present embodiment, the decrease ratio β is predetermined in accordance with the experiments of the inventors, and the decrease ratio β is adjusted (decreased or increased) to a suitable value depending on the magnitude of the maximum master cylinder pressure PmcMAX. It is possible for the present embodiment to determine the time of the termination of the brake-assisting control with accuracy, so as to eliminate the differences of the braking operation quantity according to the individual vehicle operators.

Accordingly, by making use of the above-described methods, the braking force controlling apparatus of the present invention can safely maintain the brake-assisting control even if a beginner unintentionally releases the braking operation force on the brake pedal during the emergency braking operation. Next, a description will be given of a braking force control procedure performed by the braking force controlling apparatus of FIG. 1.

Figure 4:
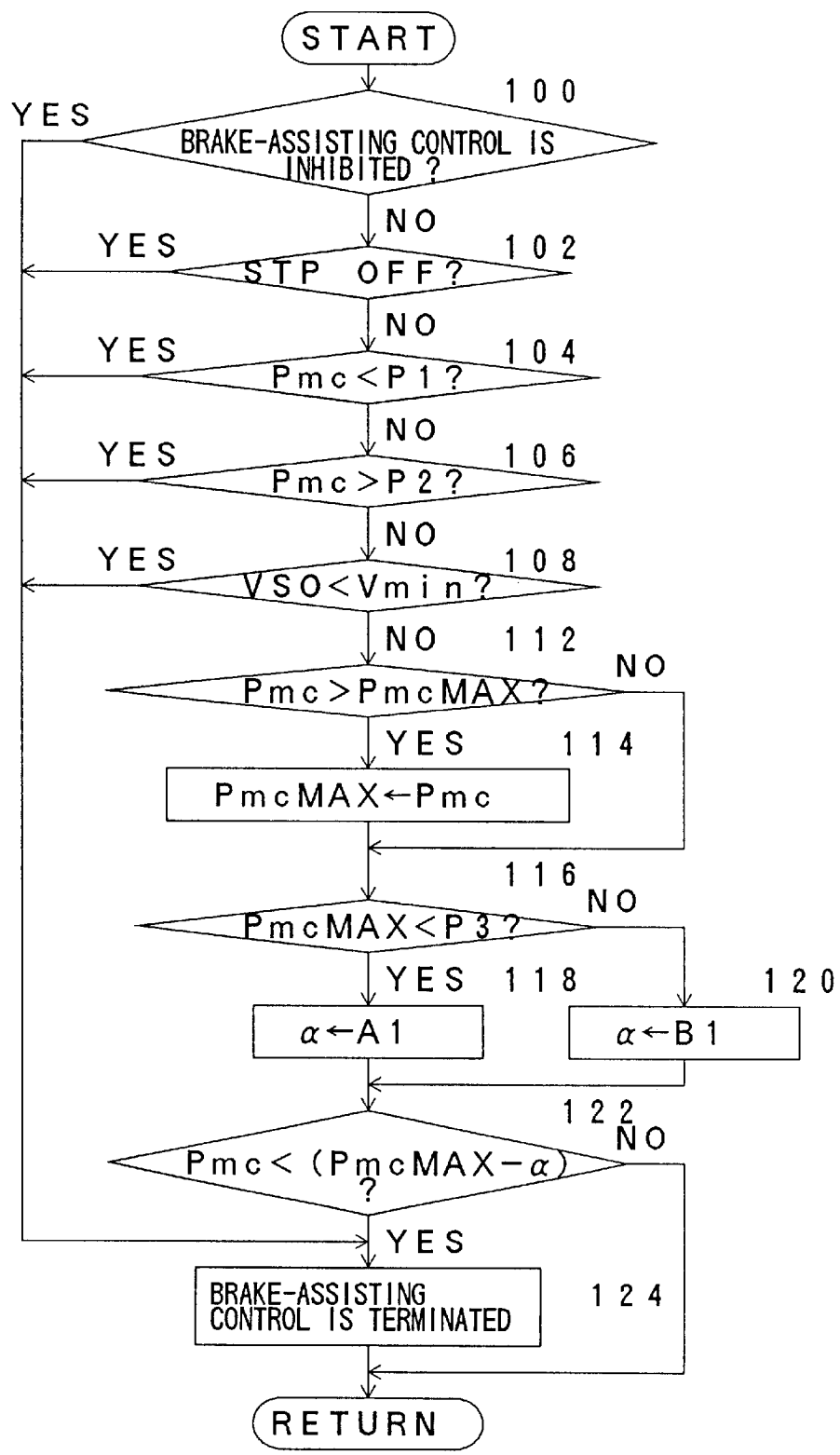
FIG. 4 is a flowchart for explaining a braking force control procedure performed by the braking force controlling apparatus of FIG. 1.

FIG. 4 shows a braking force control procedure performed by the ECU 10 of the braking force controlling apparatus of FIG. 1 in order to make a determination as to whether the brake-assisting control should be terminated. The control procedure shown in FIG. 4 is an interrupt-initiated routine which is periodically initiated at intervals of a predetermined time.

In the control procedure of FIG. 4, steps 100 through 108 are performed to determine whether the brake-assisting control is currently executed. As the control procedure of FIG. 4 is performed to determine whether the brake-assisting control should be terminated, the performance of the control procedure of FIG. 4 is useless if the brake-assisting control is not currently executed. Hence, before making a determination as to whether the brake-assisting control should be terminated, the steps 100 through 108 are performed for this purpose.

As shown in FIG. 4, the ECU 10 at step 100 determines whether the execution of the brake-assisting control is inhibited because of a malfunction in the braking force controlling apparatus. For example, when a break in a connection line between the ECU 10 and any of the hydraulic pressure sensor 40, the brake switch 84 and the wheel speed sensors 86 has occurred, or when a malfunction of any of the hydraulic pressure sensor 40, the brake switch 84 and the wheel speed sensors 86 has occurred, the execution of the brake-assisting control is inhibited. When the braking force controlling apparatus is malfunctioning, the braking-assisting control cannot be properly performed. Therefore, when the result at the step 100 is affirmative, the ECU 10 at step 124 terminates the brake-assisting control, and the subsequent steps of the control procedure are not performed. If the normal control is currently performed in the braking force controlling apparatus, the ECU 10 at step 124 maintains the normal control.

When the result at the step 100 is negative, the ECU 10 at step 102 determines whether the brake switch 84 is in an OFF state based on the signal supplied by the brake switch 84. When the result at the step 102 is affirmative, the brake pedal 30 is not depressed by the vehicle operator. When the vehicle operator does not depress the brake pedal 30, it is not necessary to perform the brake-assisting control in the braking force controlling apparatus. Therefore, when the result at the step 102 is affirmative, the ECU 10 at the step 124 terminates the brake-assisting control, and the subsequent steps of the control procedure are not performed. If the normal control is currently performed in the braking force controlling apparatus, the ECU 10 at the step 124 maintains the normal control.

When the result at the step 102 is negative, the ECU 10 at step 104 determines whether the master cylinder pressure Pmc is smaller than a given reference pressure P1. The reference pressure P1 is preset to an adequately small value for the master cylinder pressure Pmc produced in the master cylinder 32 during the emergency braking operation of the brake pedal 30. When the master cylinder pressure Pmc is smaller than the reference pressure P1, it is not necessary to perform the brake-assisting control in the braking force controlling apparatus. Therefore, when the result at the step 104 is affirmative, the ECU 10 at the step 124 terminates the brake-assisting control, and the subsequent steps of the control procedure are not performed. If the normal control is currently performed in the braking force controlling apparatus, the ECU 10 at the step 124 maintains the normal control.

When the result at the step 104 is negative, the ECU 10 at step 106 determines whether the master cylinder pressure Pmc is larger than a given reference pressure P2. The reference pressure P2 is preset to an adequately large value for the master cylinder pressure Pmc produced in the master cylinder 32 when the emergency braking operation of the brake pedal 30 is performed by the beginner. The condition in which the master cylinder pressure Pmc is larger than the reference pressure P2 may result in when the emergency braking operation is performed by the experienced vehicle operator. In this condition, it is not necessary to perform the brake-assisting control in the braking force controlling apparatus. Or, the condition in which the master cylinder pressure Pmc is larger than the reference pressure P2 may result in when a malfunction in the hydraulic pressure sensor 40 has occurred. In this condition, the brake-assisting control cannot be properly performed in the braking force controlling apparatus. Therefore, when the result at the step 106 is affirmative, the ECU 10 at the step 124 terminates the brake-assisting control, and the subsequent steps of the control procedure are not performed. If the normal control is currently performed in the braking force controlling apparatus, the ECU 10 at the step 124 maintains the normal control.

When the result at the step 106 is negative, the ECU 10 at step 108 determines whether the estimated vehicle speed Vso is smaller than a given low speed Vmin. The low speed Vmin is preset to an adequately small value for the vehicle speed at which the vehicle can be stopped without performing a sudden braking operation. The ABS control is performed in the braking force controlling apparatus in order to ensure a vehicle running stability even when the braking operation is suddenly performed by the vehicle operator. When the estimated vehicle speed Vso is smaller than the low speed Vmin, it is not necessary to perform the ABS control in the braking force controlling apparatus. Because of the same reasons, when the estimated vehicle speed Vso is smaller than the low speed Vmin, it is not necessary to perform the brake-assisting control in the braking force controlling apparatus. Therefore, when the result at the step 108 is affirmative, the ECU 10 at the step 124 terminates the brake-assisting control, and the subsequent steps of the control procedure are not performed. If the normal control is currently performed in the braking force controlling apparatus, the ECU 10 at the step 124 maintains the normal control.

When the result at the step 108 is negative, it is determined that the brake-assisting control is currently executed in the braking force controlling apparatus. Then, the ECU 10 performs the subsequent steps of the control procedure of FIG. 4 in order to make a determination as to whether the brake-assisting control should be terminated.

The ECU at step 112 determines whether the master cylinder pressure Pmc (detected at the current cycle) is larger than the maximum master cylinder pressure PmcMAX (stored at the preceding cycle). When the result at the step 112 is affirmative (Pmc>PmcMAX), the ECU 10 at step 114 substitutes the previously-stored maximum master cylinder pressure PmcMAX by the currently-detected master cylinder pressure Pmc (PmcMAX←Pmc), and stores the new maximum master cylinder pressure PmcMAX in a memory (RAM) of the ECU 10. In this manner, the maximum master cylinder pressure PmcMAX is renewed and stored in the ECU 10 every time the step 114 is performed. For example, in the case of the curve "B" of FIG. 3, the master cylinder pressure Pmc, detected at the time T1, is stored as the maximum master cylinder pressure PmcMAX in the ECU 10. After the step 114 is performed, the ECU 10 performs a next step 116. On the other hand, when the result at the step 112 is negative, the ECU 10 does not perform the step 114 and performs the step 116.

The ECU 10 at step 116 determines whether the maximum master cylinder pressure PmcMAX (stored at the current cycle) is smaller than a given reference pressure P3. In accordance with the experiments of the inventors, the reference pressure P3 is preset to a pressure larger than the maximum master cylinder pressure PmcMAX produced in the master cylinder 32 when the braking operation is performed by the beginner who has little pedal-depressing force. The step 116 is performed in order to adjust the decrease quantity α to a suitable value depending on the magnitude of the maximum master cylinder pressure PmcMAX. When PmcMAX<P3, it is determined that the braking operation is performed by the beginner who has little pedal-depressing force. When PmcMAX≧P3, it is determined that the braking operation is performed by the beginner who has a certain pedal-depressing force.

When the result at the step 116 is affirmative, the ECU 10 at step 118 sets the decrease quantity α at a relatively large value A1 (α←A1). When the result at the step 116 is negative, the ECU 10 at step 120 sets the decrease quantity a at a relatively small value B1 (α←B1). The values A1 and B1 are predetermined in accordance with the experiments of the inventors such that the value A1 is larger than the value B1.

After the step 118 or the step 120 is performed, the ECU 10 at step 122 calculates a release-judgment level of the master cylinder pressure Pmc by a difference between the maximum master cylinder pressure PmcMAX and the decrease quantity a. Further, the ECU 10 at step 122 determines whether the master cylinder pressure Pmc (detected at the current cycle) is smaller than the release-judgment level (PmcMAX−α).

When the result at the step 122 is affirmative (Pmc< (PmcMAX−α)), it is determined that the vehicle operator intentionally releases the brake pedal 30 after the condition requiring the emergency braking is avoided. The ECU 10 at the step 124 terminates the brake-assisting control. After the step 124 is performed, the control procedure of FIG. 4 ends.

On the other hand, when the result at the step 122 is negative (Pmc≧(PmcMAX−α)), it is determined that the beginner unintentionally releases the brake pedal 30 during the emergency braking operation. In this case, the ECU does not performs the step 124 and the braking force control procedure of FIG. 4 ends. Hence, the braking force controlling apparatus of the present embodiment can safely maintain the brake-assisting control when the beginner unintentionally releases the braking operation force on the brake pedal 30 during the emergency braking operation.

In the present embodiment, even if the beginner unintentionally releases the braking operation force on the brake pedal 30 during the emergency braking operation, the braking-assisting control is safely maintained. The braking force controlling apparatus of the present embodiment is effective in matching the brake-assisting control with the intention of the vehicle operator. It is possible to quickly increase the braking force by the brake-assisting control when the condition requiring the emergency braking has occurred. The steps 116–120 in the control procedure of FIG. 4 are performed to adjust the decrease quantity a to a suitable value depending on the magnitude of the maximum master cylinder pressure PmcMAX. It is possible to determine the time of the termination of the brake-assisting control with accuracy by eliminating the differences of the braking operation quantity according to the individual vehicle operators.

Figure 5:
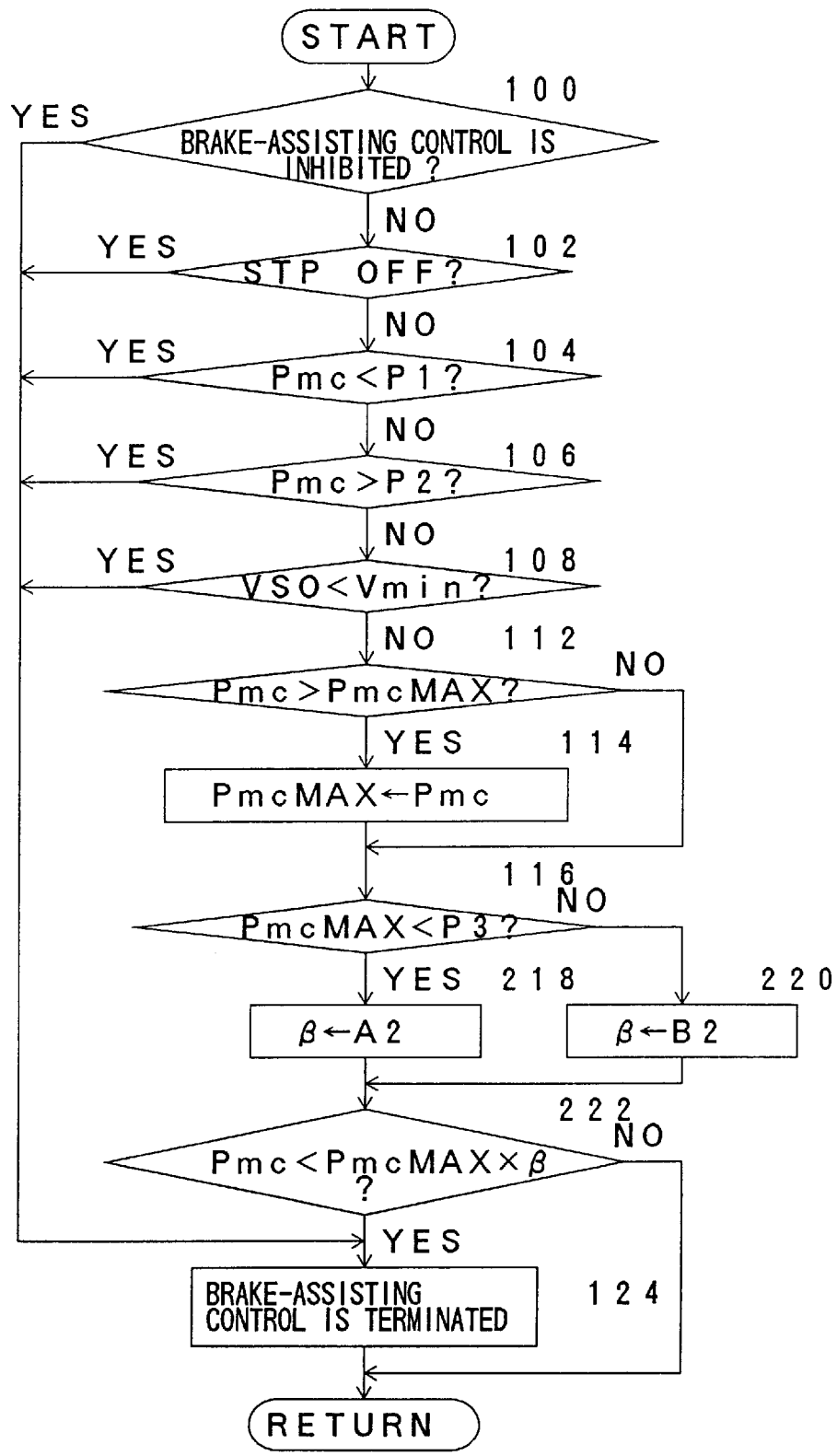
FIG. 5 is a flowchart for explaining another braking force control procedure performed by the braking force controlling apparatus of FIG. 1.

Next, FIG. 5 shows another braking force control procedure performed by the ECU 10 of the braking force controlling apparatus of FIG. 1 in order to make a determination as to whether the brake-assisting control should be terminated. The control procedure shown in FIG. 5 is an interrupt-initiated routine which is periodically initiated at intervals of a predetermined time.

In FIG. 5, the steps which are the same as corresponding steps in FIG. 4 are designated by the same reference numerals, and a description thereof will be omitted.

In the control procedure of FIG. 5, only steps 218 through 222 are different from the corresponding steps in the control procedure of FIG. 4. As described above, in the control procedure of FIG. 4, the release-judgment level of the master cylinder pressure Pmc is calculated by the difference between the maximum master cylinder pressure PmcMAX and the decrease quantity $\alpha$. The determination as to whether the brake-assisting control should be terminated is made by the comparison of the master cylinder pressure Pmc and the release-judgment level (PmcMAX–$\alpha$).

In the control procedure of FIG. 5, the ECU 10 at step 222 calculates a release-judgment level of the master cylinder pressure Pmc by a product of the maximum master cylinder pressure PmcMAX and the decrease ratio $\beta$ ($0<\beta<1$). Further, the ECU 10 at step 222 determines whether the master cylinder pressure Pmc (detected at the current cycle) is smaller than the release-judgment level (PmcMAX×$\beta$).

When the result at the step 222 is affirmative (Pmc<(PmcMAX×$\beta$)), it is determined that the vehicle operator intentionally releases the brake pedal 30 after the condition requiring the emergency braking is avoided. The ECU 10 at the step 124 terminates the brake-assisting control. After the step 124 is performed, the control procedure of FIG. 5 ends.

On the other hand, when the result at the step 222 is negative (Pmc$\leq$(PmcMAX×$\beta$)), it is determined that the beginner unintentionally releases the brake pedal 30 during the emergency braking operation. In this case, the ECU does not performs the step 124 and the braking force control procedure of FIG. 5 ends.

Similar to FIG. 4, in the control procedure of FIG. 5, when the result at the step 116 is affirmative (PmcMAX<P3), it is determined that the braking operation is performed by the beginner who has little pedal-depressing force. In this case, the ECU 10 at step 218 sets the decrease ratio $\beta$ at a relatively large value A2 ($\beta\leftarrow$A2). On the other hand, when the result at the step 116 is negative (PmcMAX$\geq$P3), it is determined that the braking operation is performed by the beginner who has a certain pedal-depressing force. In this case, the ECU 10 at step 220 sets the decrease ratio $\beta$ at a relatively small value B2 ($\beta\leftarrow$B2). The values A2 and B2 are predetermined in accordance with the experiments of the inventors such that the value A2 is larger than the value B2.

After the step 218 or the step 220 is performed, the ECU 10 performs the above-described step 222. When it is determined that the vehicle operator intentionally releases the brake pedal 30 after the condition requiring the emergency braking is avoided, the ECU 10 at the step 124 terminates the brake-assisting control. After the step 124 is performed, the control procedure of FIG. 5 ends. On the other hand, when it is determined that the beginner unintentionally releases the brake pedal 30 during the emergency braking operation, the ECU does not performs the step 124 and the braking force control procedure of FIG. 5 ends. Hence, the braking force controlling apparatus of the present embodiment can safely maintain the brake-assisting control when the beginner unintentionally releases the braking operation force on the brake pedal 30 during the emergency braking operation.

Similar to the control procedure of FIG. 4, in the present embodiment, even if the beginner unintentionally releases the braking operation force on the brake pedal 30 during the emergency braking operation, the braking-assisting control is safely maintained. The braking force controlling apparatus of the present embodiment is effective in matching the brake-assisting control with the intention of the vehicle operator. It is possible to quickly increase the braking force by the brake-assisting control when the condition requiring the emergency braking has occurred. The steps 116, 218 and 220 in the control procedure of FIG. 5 are performed to adjust the decrease ratio $\beta$ to a suitable value depending on the magnitude of the maximum master cylinder pressure PmcMAX. It is possible to determine the time of the termination of the brake-assisting control with accuracy by eliminating the differences of the braking operation quantity according to the individual vehicle operators.

In the above-described embodiments, the determination as to whether the braking operation of the brake pedal by the vehicle operator is an intentional operation or not is made based on the master cylinder pressure Pmc. However, the basic parameter for making the determination according to the present invention is not limited to the master cylinder pressure Pmc.

When the braking operation of the brake pedal 30 is performed, not only the master cylinder pressure Pmc, but also the braking operation force Fp on the brake pedal 30 or a stroke L of the brake pedal 30 varies in accordance with a quantity of the braking operation. Further, when the braking force is exerted on the vehicle as a result of the braking operation of the brake pedal 30, a deceleration G of the vehicle is produced. By taking account of these factors, the determination as to whether the braking operation is an emergency braking operation or a normal braking operation, and the determination as to whether the braking operation is an intentional operation may be made based on any of the basic parameters including: (1) the master cylinder pressure Pmc; (2) the braking operation force Fp; (3) the brake pedal stroke L; (4) the vehicle deceleration G; (5) the estimated vehicle speed Vso; and (6) the wheel speed Vw.

Figure 6:
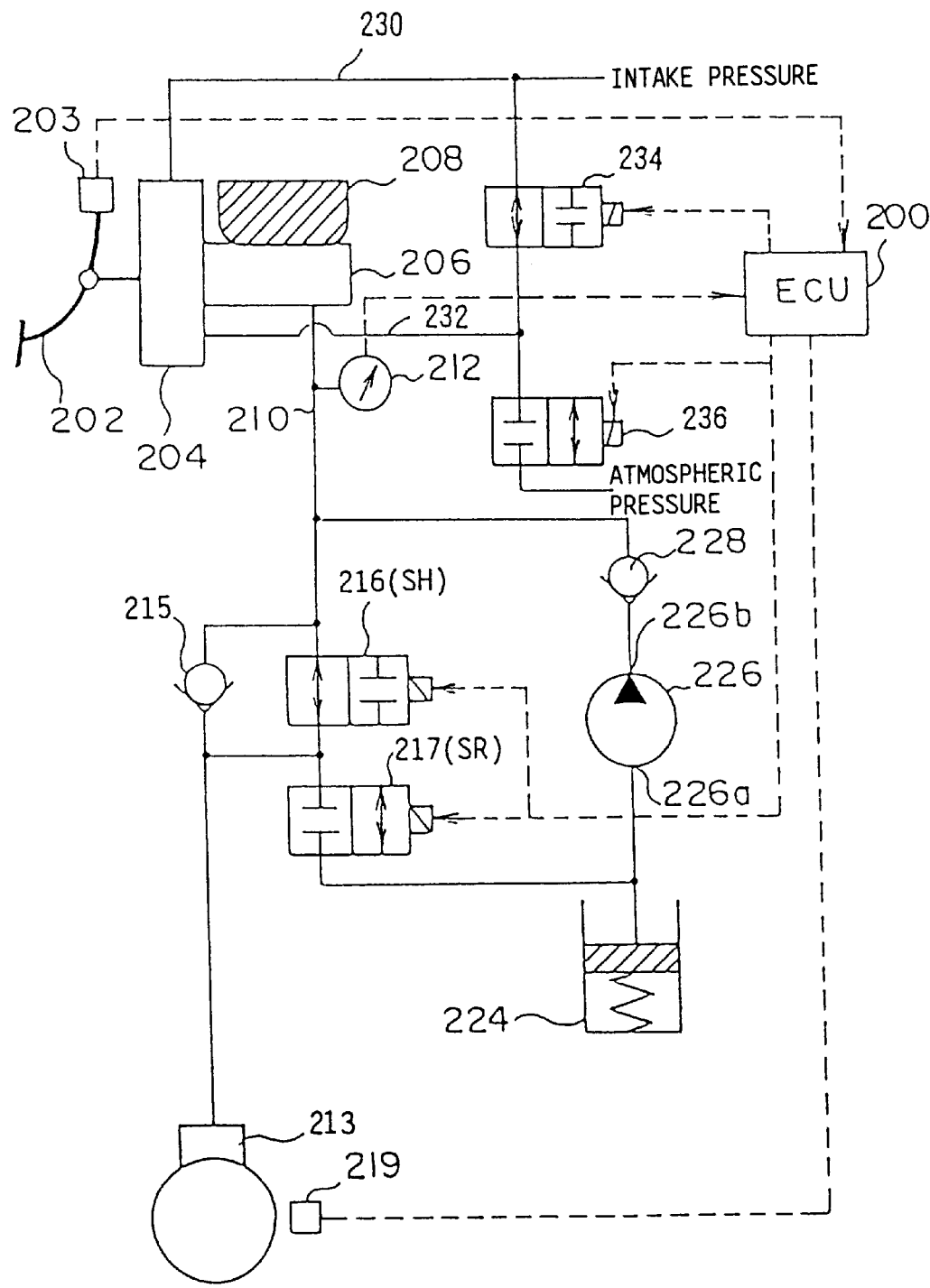
FIG. 6 is a diagram of a second embodiment of the braking force controlling apparatus of the present invention.

Next, a description will be given of a second embodiment of the preset invention with reference to FIG. 6. FIG. 6 shows the second embodiment of the braking force controlling apparatus of the present invention. For the sake of simplicity of description, a configuration of the braking force controlling apparatus having only one wheel cylinder provided for only one wheel of an automotive vehicle is illustrated in FIG. 6.

As shown in FIG. 6, the braking force controlling apparatus of the present embodiment is controlled by an electronic control unit 200 (hereinafter, called ECU 200). The braking force controlling apparatus of FIG. 6 includes a brake pedal 203. A brake switch 203 is provided in the vicinity of the brake pedal 202. When the brake pedal 202 is depressed by the vehicle operator, the brake switch 203 outputs an ON signal to the ECU 200. The ECU 200 determines whether the braking operation is performed by the vehicle operator, based on the signal supplied by the brake switch 203.

The brake pedal 202 is connected to a vacuum booster 204. The vacuum booster 204 serves to increase the braking operation force of the brake pedal 202 by using an intake pressure of air into an internal combustion engine of the vehicle. A master cylinder 206 is fixed to the vacuum booster 204. When the brake pedal 202 is depressed, a resultant force of the braking operation force Fp, exerted on the brake pedal 202, and a brake-assisting force Fa, produced by the vacuum booster 204, is transmitted from the vacuum booster 204 to the master cylinder 206.

The master cylinder 206 includes a pressure chamber provided therein. A reservoir tank 208 is provided on the top of the master cylinder 206. When the braking operation force on the brake pedal 202 is released by the vehicle operator, the reservoir tank 208 is connected to or communicates with the pressure chamber of the master cylinder 206. When the brake pedal 202 is depressed by the vehicle operator, the reservoir tank 208 is disconnected from or isolated from the pressure chamber of the master cylinder 206. Hence, the pressure chamber of the master cylinder 206 is replenished with brake fluid from the reservoir tank 208 every time the braking operation force on the brake pedal 202 is released by the vehicle operator.

A hydraulic pressure line 210 is connected to the pressure chamber of the master cylinder 206. A hydraulic pressure sensor 212 is provided at an intermediate portion of the pressure line 210. The hydraulic pressure sensor 212 outputs a signal, indicative of the master cylinder pressure Pmc, to the ECU 10. The ECU 200 detects the master cylinder pressure Pmc, produced in the master cylinder 206, based on the signal supplied by the hydraulic pressure sensor 212.

A pressure-holding solenoid 216 (hereinafter called SH 216) is provided in the pressure line 210. The SH 216 is a two-position solenoid valve which is normally set in a valve-open position so as to connect the master cylinder 206 to a wheel cylinder 213. When a drive signal is supplied to the SH 216 by the ECU 200, the SH 216 is set in a valve-closed position so as to disconnect the master cylinder 206 from the wheel cylinder 213.

The wheel cylinder 213 is connected on the downstream side of the SH 216 to the pressure line 210. A pressure-reducing solenoid 217 (hereinafter called SR 217) is also connected on the downstream side of the SH 216 to the pressure line 210. The SR 217 is a two-position solenoid valve which is normally set in a valve-closed position so as to inhibit a flow of the brake fluid from the wheel cylinder 213 to a downstream portion of the pressure line 210 via the SR 217. When a drive signal is supplied to the SR 217 by the ECU 200, the SR 217 is set in a valve-open position so as to allow the flow of the brake fluid from the wheel cylinder 213 to the downstream portion of the pressure line 210 via the SR 217. In addition, a check valve 215 is provided in a bypass line of the pressure line 210 around the SH 216, and the bypass line is connected to the wheel cylinder 213. The check valve 215 allows only a flow of the brake fluid from the wheel cylinder 213 to the pressure line 210, and inhibits a counter flow of the brake fluid from the pressure line 210 to the wheel cylinder 213.

A wheel speed sensor 219 is provided in the vicinity of the wheel of the vehicle for which the wheel cylinder 213 is provided. The wheel speed sensor 219 outputs a signal, indicative of a wheel speed of the vehicle, to the ECU 200. The ECU 200 detects the wheel speed of the vehicle wheel based on the signal supplied by the wheel speed sensor 219.

A reservoir 224 is connected to the pressure line 210 on the downstream side of the SR 217. When the SR 217 is set in the valve-open position, the brake fluid from the SR 217 flows into the reservoir 224, and stored in the reservoir 224. In the reservoir 224, a certain amount of brake fluid is initially stored. A pump 226 is provided in the pressure line 210, and has an inlet port 226a which is connected to the reservoir 224. The pump 226 has an outlet port 226b which is connected to a check valve 228 in the pressure line 210. The check valve 228 is connected to the upstream side of the SH 216 through the pressure line 210. The check valve 228 allows only a flow of the brake fluid from the outlet port 216b of the pump 226 to the upstream side of the SH 216 in the pressure line 210, and inhibits a counter flow of the brake fluid from the upstream side of the SH 216 to the outlet port 226b of the pump 226.

An intake pressure line 230 and a pressure adjustment line 232 are connected to the vacuum booster 204. An intake pipe of the engine or the like is connected to the intake pressure line 230, and an intake pressure from the intake pipe is delivered through the intake pressure line 230 to the vacuum booster 204. The pressure adjustment line 232 is connected to both an intake pressure valve 234 and an atmospheric pressure valve 236. The intake pressure valve 234 is provided between the intake pressure line 230 and the pressure adjustment line 232. The intake pressure valve 234 is a two-position solenoid valve which is normally set in a valve-open position so as to connect the intake pressure line 230 and the pressure adjustment line 2332. When a drive signal is supplied to the valve 234 by the ECU 200, the valve 234 is set in a valve-closed position so as to disconnect the pressure adjustment line 232 from the intake pressure line 230. The atmospheric pressure valve 236 is provided between the pressure adjustment line 232 and an atmospheric pressure line which is open to the atmosphere. The atmospheric pressure valve 236 is a two-position solenoid valve which is normally set in a valve-closed position so as to disconnect the pressure adjustment line 232 from the atmospheric pressure line. When a drive signal is supplied to the valve 236 by the ECU 200, the valve 236 is set in a valve-open position so as to connect the pressure adjustment line 232 and the atmospheric pressure line.

The vacuum booster 204 includes an intake pressure chamber and a pressure adjusting chamber both provided therein. In the vacuum booster 204, the intake pressure chamber and the pressure adjusting chamber are separated from each other by a diaphragm. The intake pressure chamber is connected to the intake pressure line 230. When the vehicle is normally running, the intake pressure chamber of the vacuum booster 204 is held at a vacuum pressure of the intake pressure of the intake pressure line 230. The pressure adjusting chamber of the vacuum booster 204 is connected to the pressure adjustment line 232 through a valve device. The valve device is provided in the vacuum booster 204 to adjust an internal pressure of the pressure adjusting chamber in accordance with the braking operation of the brake pedal 202.

The operation of the valve device of the vacuum booster 204 will now be described. When the intake pressure from the intake pressure valve 234 is supplied to the pressure adjustment line 232, the valve device connects the pressure adjusting chamber to the pressure adjustment line 232 until a difference in pressure between the pressure adjusting chamber and the intake pressure chamber is produced in proportion to the braking operation force Fp on the brake pedal 202 by the vehicle operator. An actuating force which is proportional to the difference in pressure between the pressure adjusting chamber and the intake pressure chamber (or in proportion to the braking operation force Fp) is exerted on the diaphragm between the pressure adjusting chamber and the intake pressure chamber. Therefore, when the brake pedal 202 is depressed, the brake-assisting force Fa is produced by the vacuum booster 204 in accordance with the actuating force on the diaphragm, so that a resultant force of the braking operation force Fp and the brake-assisting force Fa is transmitted from the vacuum booster 204 to the master cylinder 206.

On the other hand, when the atmospheric pressure from the atmospheric pressure valve 236 is supplied to the pressure adjusting line 232, the valve device of the vacuum booster 204 connects the pressure adjusting chamber to the pressure adjustment line 232 so that the atmospheric pressure is supplied to the pressure adjusting chamber by the valve device, regardless of whether the braking operation force Fp on the brake pedal 202. An actuating force which is proportional to the difference in pressure between the pressure adjusting chamber and the intake pressure chamber is exerted on the diaphragm between the pressure adjusting chamber and the intake pressure chamber. At this time, a maximum brake-assisting force FaMAX is produced in accordance with the actuating force on the diaphragm by the vacuum booster 204.

Next, a description will be given of the operation of the braking force controlling apparatus of the present embodiment.

In the braking force controlling apparatus of the present embodiment, when a normal control is performed by the ECU 200, the ECU 200 supplies no drive signals to the intake pressure valve 234 and the valve 236 so that the valve 234 is set in the valve-open position and the valve 236 is set in the valve-closed position. In this condition, when the brake pedal 202 is depressed by the vehicle operator, the brake-assisting force Fa is produced by the vacuum booster 204 in accordance with the actuating force on the diaphragm, so that a resultant force of the braking operation force Fp and the brake-assisting force Fa is transmitted from the vacuum booster 204 to the master cylinder 206.

When the vacuum booster 204 transmits the resultant force of the braking operation force Fp and the brake-assisting force Fa to the master cylinder 206, the master cylinder 206 produces a master cylinder pressure Pmc which is equal to the braking operation force Fp multiplied by a given magnification factor. Hence, when the normal control is performed, the braking force controlling apparatus of the present embodiment generates a braking force in accordance with the braking operation force Fp on the brake pedal 202.

When the operating condition of the vehicle is found stable, the normal control is performed by the ECU 200 of the braking force controlling apparatus of the present embodiment. During the normal control, the ECU 200 supplies no drive signals to the SH 216 and the SR 217, so that the SH 216 is set in the valve-open position and the SR 217 is set in the valve-closed position as shown in FIG. 6. The ECU 10 stops the operation of the pump 226 during the normal control. When the hydraulic circuit related to the wheel cylinder 213 is placed in the above condition by the normal control, the master cylinder pressure Pmc from the master cylinder 206 is supplied to the wheel cylinder 213 through the SH 216. Hence, during the normal control, the wheel cylinder 213 generates a braking force on the vehicle wheel in accordance with the braking operation force Fp on the brake pedal 202.

Similar to the first embodiment of FIG. 1, when the slip ratio is found to be above a reference value after the braking operation is performed in the braking force controlling apparatus of the present embodiment, it is determined that the ABS control execution conditions are satisfied. After this determination is made, the execution of the ABS control of the braking force controlling apparatus is started by the ECU 200. When the brake pedal 202 is depressed, or when the master cylinder pressure Pmc from the master cylinder 206 is increased to an adequately high pressure, the ABS control is achieved by the ECU 200. That is, during the ABS control, the ECU 200 starts the operation of the pump 226, and controls the drive signals supplied to the SH 216 and the SR 217 in the following manner.

During the ABS control of the present embodiment, if the adequately increased master cylinder pressure Pmc is supplied by the master cylinder 206, the ECU may control the SH 216 and the SR 217 such that the SH 216 is set in the valve-open position and the SR 217 is set in the valve-closed position. When the ECU 200 performs this control procedure, the wheel cylinder pressure Pwc of the wheel cylinder 213 is increased up to the master cylinder pressure Pmc. Hereinafter, this control procedure will be called (1) a pressure-increasing control mode.

Alternatively, during the ABS control of the present embodiment, the ECU 200 may control the SH 216 and the SR 217 such that the SH 216 is set in the valve-closed position and the SR 217 is set in the valve-closed position. When the ECU 200 performs this control procedure, the wheel cylinder pressure Pwc of the wheel cylinder 213 is held at the same level without increase or decrease. Hereinafter, this control procedure will be called (2) a pressure-holding control mode.

Alternatively, during the ABS control of the present embodiment, the ECU 200 may control the SH 216 and the SR 217 such that the SH 216 is set in the valve-closed position and the SR 217 is set in the valve-open position. When the ECU 200 performs this control procedure, the wheel cylinder pressure Pwc of the wheel cylinder 213 is decreased. Hereinafter, this control procedure will be called (3) a pressure-decreasing control mode.

In the braking force controlling apparatus of the present embodiment, the ECU 200 suitably performs one of (1) the pressure-increasing control mode, (2) the pressure-holding control mode and (3) the pressure-decreasing control mode so as to maintain the slip ratio below the reference value, preventing the vehicle wheel from being locked during the braking operation.

It is necessary to quickly decrease the wheel cylinder pressure Pwc of the wheel cylinder 213 after the vehicle operator releases the braking operation force on the brake pedal 202. In the braking force controlling apparatus of the present embodiment, the check valve 215 is provided in the bypass line connected to the wheel cylinder 213 so as to allow only the flow of the brake fluid from the wheel cylinder 213 to the pressure line 210. As the check valve 215 functions in this manner, it is possible for the braking force controlling apparatus of the present embodiment to quickly decrease the wheel cylinder pressure Pwc after the vehicle operator releases the braking operation force on the brake pedal 202 during the ABS control.

During the ABS control of the braking force controlling apparatus of the present embodiment, the wheel cylinder pressure Pwc of the wheel cylinder 213 is suitably adjusted by supplying the master cylinder pressure Pmc from the master cylinder 206 to the wheel cylinder 213. When the brake fluid from the master cylinder 206 is delivered to the wheel cylinder 213, the wheel cylinder pressure Pwc is increased, and, when the brake fluid within the wheel cylinder 213 is delivered to the reservoir 224, the wheel cylinder pressure Pwc is decreased. If the increase of the wheel cylinder pressure Pwc is performed by using the master cylinder 206 as the only brake fluid pressure source, the brake fluid contained in the master cylinder 206 is gradually decreased through a repeated execution of the pressure-increasing control mode and the pressure-decreasing control mode. However, in the present embodiment, the brake fluid contained in the reservoir 224 is returned back to the master cylinder 206 by the pump 226. Therefore, it is possible to prevent the master cylinder 206 from malfunctioning due to a too small amount of the brake fluid contained therein even when the ABS control is continuously performed over an extended period of time.

Next, a description will be given of the operation of the braking force controlling apparatus of the present embodiment when a brake-assisting control is performed by the ECU 200.

When the brake-assisting control is performed in the present embodiment, the ECU 200 supplies the drive signals to the intake pressure valve 234 and the atmospheric pressure valve 236 such that the valve 234 is set in the valve-closed position and the valve 236 is set in the valve-open position.

In the braking force controlling apparatus of the present embodiment, when the execution of the brake-assisting control is started, the atmospheric pressure from the atmospheric pressure valve 236 is supplied to the pressure adjustment line 232. As described above, when the atmospheric pressure is supplied to the pressure adjustment line 232, the atmospheric pressure is supplied to the pressure adjusting chamber of the vacuum booster 206 by the valve device thereof, and the vacuum booster 204 produces the maximum brake-assisting force FaMAX. Hence, when the execution of the brake-assisting control is started, a resultant force of the braking operation force Fp and the maximum brake-assisting force FaMAX is transmitted to the master cylinder 206 by the vacuum booster 204.

During a period between from the start of the brake-assisting control to the start of the ABS control, the ECU 200 maintains the hydraulic circuit connected to the master cylinder 206 under the condition of the normal control. In this condition, the master cylinder pressure Pmc from the master cylinder 206 is supplied to the wheel cylinder 213 through the SH 216. Hence, after the start of the brake-assisting control, the wheel cylinder pressure Pwc of the wheel cylinder 213 can be quickly increased in accordance with a change of the force transmitted to the master cylinder 206 from the resultant force "Fa+Fp" to the resultant force "FaMAX+Fp".

In the braking force controlling apparatus of the present embodiment, when an emergency braking operation of the brake pedal 202 is performed, it is possible to quickly increase the wheel cylinder pressure Pwc of the wheel cylinder 213 to a level adequately higher than a corresponding level for the braking operation force Fp. Therefore, in the braking force controlling apparatus of the present embodiment, after the condition requiring the emergency braking has occurred, it is possible to quickly generate an increased braking force larger than that generated during the normal control even if the vehicle operator is a beginner.

After the wheel cylinder pressure Pwc is quickly increased as described above, the increased braking force is generated on the vehicle, and a relatively large slip ratio of the vehicle wheel is produced. It is then determined that the ABS control execution conditions are satisfied. After this determination is made, the execution of the ABS control of the braking force controlling apparatus of the present embodiment is started. As described above, the ECU 200 suitably performs one of (1) the pressure-increasing control mode, (2) the pressure-holding control mode and (3) the pressure-decreasing control mode so as to maintain the slip ratio of the vehicle wheel below the reference value, preventing the vehicle wheel from being locked during the braking operation.

In the braking force controlling apparatus of the present embodiment, when the braking operation force Fp is exerted on the brake pedal 202 by the vehicle operator after the start of the brake-assisting control, the master cylinder pressure Pmc is maintained at the level in accordance with the resultant force "FaMAX+Fa" supplied by the vacuum booster 204. When the braking operation force on the brake pedal 202 is released by the vehicle operator after the start of the brake-assisting control, the master cylinder pressure Pmc is decreased to the level in accordance with the maximum brake-assisting force "FaMAX" supplied by the vacuum booster 204.

The ECU 200 monitors the signal supplied by the hydraulic pressure sensor 212, and determines whether the braking operation force on the brake pedal 202 is released by the vehicle operator, based on the signal supplied by the hydraulic pressure sensor 212. When it is determined that the braking operation force on the brake pedal 202 is released, the ECU 200 stops supplying the drive signals to the valves 234 and 236 so as to terminate the brake-assisting control.

In the braking force controlling apparatus of the present embodiment, the ECU 200 performs either the braking force control procedure of FIG. 4 or the braking force control procedure of FIG. 5 in a similar manner to the ECU 10 of the previous embodiment of FIG. 1. Hence, in the present embodiment, even if the beginner unintentionally releases the braking operation force on the brake pedal during the emergency braking operation, the braking-assisting control is safely maintained. The braking force controlling apparatus of the present embodiment is effective in matching the brake-assisting control with the intention of the vehicle operator. It is possible to quickly increase the braking force by the brake-assisting control when the condition requiring the emergency braking has occurred. In addition, the steps 116–120 in the control procedure of FIG. 4 are performed to adjust the decrease quantity a to a suitable value depending on the magnitude of the maximum master cylinder pressure PmcMAX. It is possible to determine the time of the termination of the brake-assisting control with accuracy by eliminating the differences of the braking operation quantity according to the individual vehicle operators.

In the above-described embodiments, the ECU 10 or the ECU 200 can determine whether a brake releasing operation during the brake-assisting control is an intentional operation or not, based on the braking operation quantity and the maximum quantity. When the brake releasing operation is determined as being not an intentional operation, the ECU 10 or the ECU 200 maintains the brake-assisting control. Hence, when the emergency braking is required, it is possible for the braking force controlling apparatus of the present invention to quickly increase the braking force to be larger than the level during the normal control by maintaining the brake-assisting control. On the other hand, when the brake releasing operation is determined as being an intentional operation, the ECU 10 or the ECU 200 terminates the brake-assisting control. Hence, the braking force controlling apparatus of the present invention is effective in maintaining the brake-assisting control even if a beginner unintentionally releases the braking operation force on the brake pedal during the emergency braking operation.

Further, the present invention is not limited to the above-described embodiments, and variations and modifications may be made without departing from the scope of the present invention.

What is claimed is:

1. A braking force controlling apparatus which selectively performs one of a normal control to generate a braking force by a braking operation and a brake-assisting control to generate an increased braking force larger than the braking force generating during the normal control, said apparatus comprising:

an operation quantity detection means for detecting a quantity of operation of a brake pedal;

a maximum operation quantity storage means for storing a value representative of a maximum quantity of operation of the brake pedal detected by the operation quantity detection means; and a brake-assisting control termination judgment means for determining, based on a result of comparison of the operation quantity detected by the operation quantity detection means and the value representative of the maximum quantity stored by the maximum operation quantity storage means, whether the brake-assisting control should be terminated.

2. The apparatus according to claim 1, characterized in that the brake-assisting control termination judgment means (10, 122, 124) terminates the brake-assisting control when the braking operation quantity is smaller than a difference between the maximum quantity and a decrease quantity.

3. The apparatus according to claim 1, characterized in that the brake-assisting control termination judgment means (10, 122, 124) terminates the brake-assisting control when the braking operation quantity is smaller than a product of the maximum quantity and a decrease ratio.

4. The apparatus according to claim 1, wherein, during the brake-assisting control, the brake-assisting control termination judgment means discriminates, based on the detected braking operation quantity and the maximum quantity stored by the maximum operation quantity storage means, between intentional brake releasing operations and unintentional brake releasing operations, wherein, when the brake releasing operation is determined to be unintentional, the brake-assisting control termination judgment means maintains the brake-assisting control.

5. The apparatus according to claim 1, characterized in that the apparatus further comprises a judgment means (10, 102) for determining whether the brake-assisting control is currently being performed, wherein, when the judgment means determines that the brake-assisting control is currently being performed, the brake-assisting control termination judgment means (122) determines whether the brake-assisting control should be terminated.

6. The apparatus according to claim 2, characterized in that the apparatus further comprises a maximum quantity judgment means (116, 118, 120) for determining whether the maximum quantity of the braking operation is smaller than a predetermined quantity, wherein, when the maximum quantity is determined as being smaller than the predetermined quantity, the maximum quantity judgment means sets the decrease quantity at a relatively large value, and, when the maximum quantity is determined as being not smaller than the predetermined quantity, the maximum quantity judgment means sets the decrease quantity at a relatively small value.

7. The apparatus according to claim 3, characterized in that the apparatus further comprises a maximum quantity judgment means (116, 218, 220) for determining whether the maximum quantity of the braking operation is smaller than a predetermined quantity, wherein, when the maximum quantity is determined as being smaller than the predetermined quantity, the maximum quantity judgment means sets the decrease ratio at a relatively large value, and, when the maximum quantity is determined as being not smaller than the predetermined quantity, the maximum quantity judgment means sets the decrease ratio at a relatively small value.

8. The apparatus according to claim 1, characterized in that the operation quantity detection means (10, 40) detects the quantity of the braking operation of the brake pedal based on a master cylinder pressure supplied by a master cylinder, and the maximum operation quantity storage means (10, 112, 114) stores the maximum quantity of the braking operation based on a maximum master cylinder pressure supplied by the master cylinder.

9. The apparatus according to claim 1, characterized in that the apparatus further comprises a judgment means (104, 106) for determining whether the braking operation quantity detected by the operation quantity detection means is smaller than a predetermined first quantity, and for determining whether the braking operation quantity is larger than a predetermined second quantity, wherein, when the braking operation quantity is determined as being smaller than the predetermined first quantity or determined as being larger than the predetermined second quantity, the brake-assisting control is maintained.

10. A braking force controlling apparatus which selectively performs one of a normal control to generate a braking force by a braking operation and a brake-assisting control to generate an increased braking force larger than the braking force generated during the normal control, said apparatus comprising:

an operation quantity detection means for detecting a quantity of operation of a brake pedal;

a maximum operation quantity storage means for storing a value representative of a maximum quantity of operation of the brake pedal detected by the operation quantity detection means; and a brake-assisting control continuation judgment means wherein, during the brake-assisting control, the brake-assisting control continuation judgment means discriminates, based on a result of comparison of the detected quantity of operation of the brake pedal and the stored value representative of maximum quantity, between intentional brake releasing operations and unintentional brake releasing operations, and wherein, when the brake releasing operation is determined to be unintentional, the brake-assisting control continuation judgment means maintains the brake-assisting control.

\* \* \* \* \*

UNITED STATES PATENT AND TRADEMARK OFFICE
CERTIFICATE OF CORRECTION

PATENT NO. : 6,409,288 B2
DATED : June 25, 2002
INVENTOR(S) : Hiroaki Yoshida et al.

It is certified that error appears in the above-identified patent and that said Letters Patent is hereby corrected as shown below:

Title page,
Item [73], change the assignee information to read as follows:
-- Toyota Jidosha Kabushiki Kaisha, Aichi-ken (JP) --.

Column 17,
Line 41, change "a" to -- $\alpha$ --.

Column 19,
Lines 28 and 33, after "result" delete -- in --.

Column 20,
Line 41, change "$\alpha$at" to -- $\alpha$ at --.
Line 44, change "a" to -- $\alpha$ --.
Line 52, change "a." to -- $\alpha$. --.
Line 66, change "performs" to -- perform --.

Column 21,
Line 15, change "a" to -- $\alpha$ --.
Line 56, change "$\leq$" to -- $\geq$ --.
Line 56, change "performs" to -- perform --.

Column 22,
Line 44, change "performs" to -- perform --.

Column 25,
Line 27, change "of whether the" to -- of the --.

UNITED STATES PATENT AND TRADEMARK OFFICE
CERTIFICATE OF CORRECTION

PATENT NO.    : 6,409,288 B2
DATED         : June 25, 2002
INVENTOR(S)   : Hiroaki Yoshida et al.

It is certified that error appears in the above-identified patent and that said Letters Patent is hereby corrected as shown below:

<u>Column 28,</u>
Line 54, change "a" to -- $\alpha$ --.

Signed and Sealed this

Thirteenth Day of May, 2003

JAMES E. ROGAN
*Director of the United States Patent and Trademark Office*